United States Patent [19]

Eda et al.

[11] Patent Number: 5,030,951
[45] Date of Patent: Jul. 9, 1991

[54] FORMAT CONVERTING SYSTEM FOR SYNCHRONOUS OPTICAL NETWORK

[75] Inventors: Hitoshi Eda, Shimodate; Kazumaro Takaiwa, Oyama; Akihiro Hayashi, Tochigi, all of Japan

[73] Assignee: Fujitsu Limited, Kawasaki, Japan

[21] Appl. No.: 478,458

[22] Filed: Feb. 8, 1990

[30] Foreign Application Priority Data

Feb. 8, 1989 [JP] Japan ................................. 1-27488

[51] Int. Cl.[5] ............................................. H03M 9/00
[52] U.S. Cl. ..................................... 341/100; 341/50; 375/112; 370/102
[58] Field of Search .................... 341/100, 101, 50; 375/112; 370/102

[56] References Cited

U.S. PATENT DOCUMENTS

| 4,095,053 | 6/1978 | Duttweiler et al. | 370/102 |
| 4,347,620 | 8/1982 | Black et al. | 370/102 X |
| 4,710,922 | 12/1987 | Scott | 341/100 X |
| 4,764,941 | 8/1988 | Choi | 375/112 |
| 4,885,583 | 12/1989 | McCambridge | 341/100 |

FOREIGN PATENT DOCUMENTS 2814081 10/1979 Fed. Rep. of Germany .

Primary Examiner—William M. Shoop, Jr.
Assistant Examiner—Sharon D. Logan
Attorney, Agent, or Firm—Staas & Halsey

[57] ABSTRACT

A format converting system includes a first converter which converts an input signal into N parallel signals (N is an integer). Each of the N parallel signals has a bit rate less than that of the input signal. A latch circuit temporarily latches the N parallel signals in accordance with a clock signal and outputs a plurality of latched signals having a number larger than the N. A selector selectively outputs the latched signals from the latch circuit and stuff bits to be inserted in the N parallel signals in accordance with a control signal so that N parallel output signals having the N parallel signal and the stuff bits are output from the selector. The stuff bits are used for converting a frame format of the input signal into a different frame format. A control circuit generates the clock signal and generates the control signal which instructs the selector to change an order of selecting the latched outputs and the stuff bits to thereby form the N parallel output signals when the number of the stuff bits to be inserted into the N parallel signals is not an integer multiple of N. A second converter converts the N parallel output signals into a serial output signal having the different frame format.

22 Claims, 22 Drawing Sheets

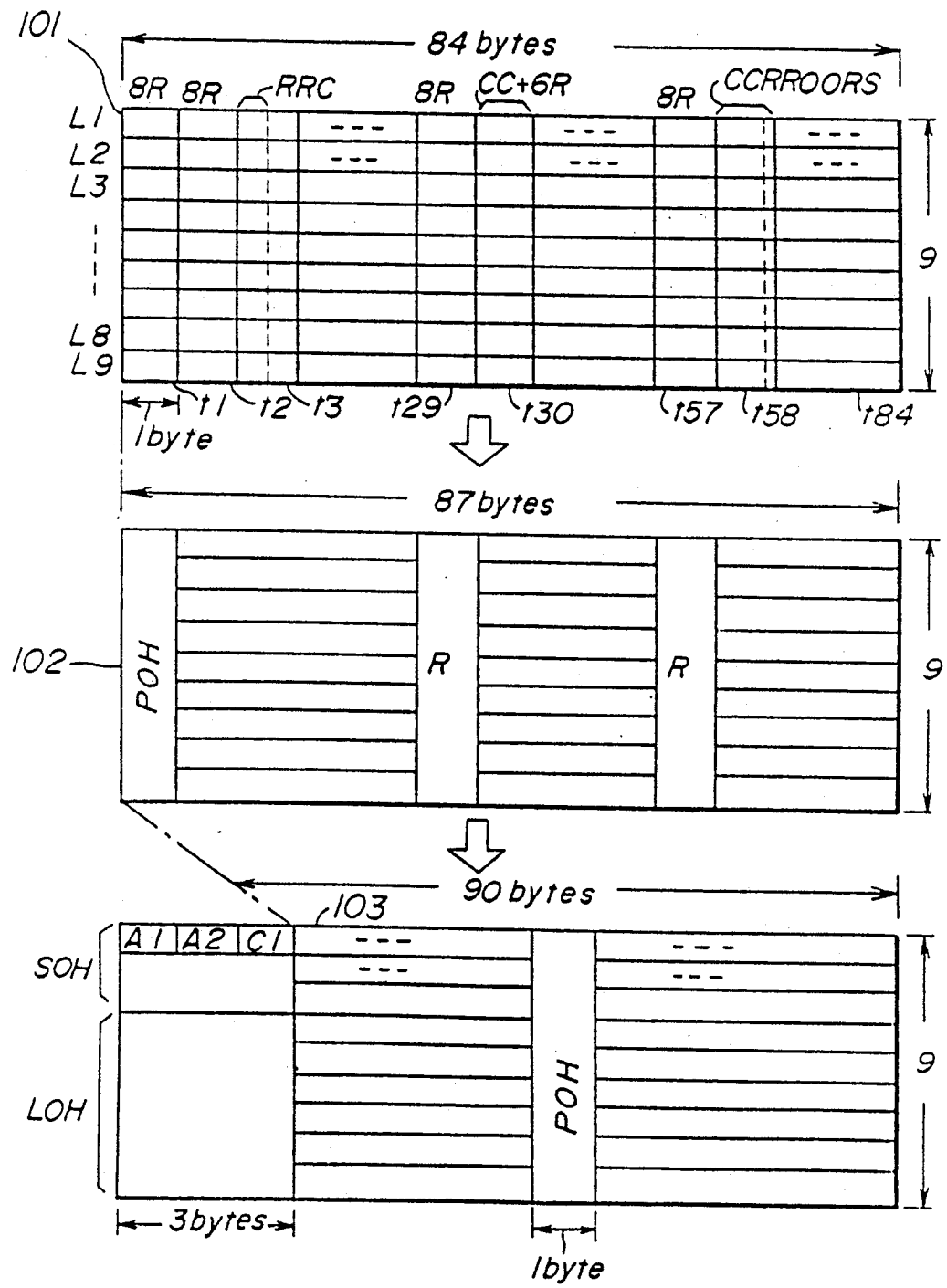
FIG. IA PRIOR ART

DATA SEQUENCE AT OUTPUT OF CONVERTER 21

| 159 | 159 |
| 26 | 26 |
| 37 | 37 |
| 48 | 48 |

FIG. 4B(b)

DATA SEQUENCE AT OUTPUT OF SELECTOR 24 WHEN C=0 (NON-STUFFING)

| RRRRR26 | RRCRI59 | 198 | RRCO26 | 198 |
| RRRRR37 | 198 RRCR26 | | RRCO37 | 199 |
| RRRRC48 | 199 RRRR37 | | RRRR48 | 200 |
| RRRRI59 | 200 RRRR48 | | RRRI59 | |
| SET 1 * | SET 2 | | SET 3 * | |

FIG. 4B(c)

DATA SEQUENCE AT OUTPUT OF SELECTOR 24 WHEN C=1 (STUFFING)

| RRRRR26 | RRCRI59 | 198 | RRCOI59 | 198 |
| RRRRR37 | 198 RRCR26 | | RRCO26 | 199 |
| RRRRC48 | 199 RRRR37 | | RRRR37 | 200 |
| RRRRI59 | 200 RRRR48 | | RRRS48 | |
| SET 1 * | SET 2 | | SET 3 | |

FIG. 17

| | | | T1 | T2 | | |
|---|---|---|---|---|---|---|
| Dn 1 | (1) | (5) | (9) | (13) | | |
| Dn 2 | (2) | (6) | (10) | | | |
| Dn 3 | (3) | (7) | (11) | | | |
| Dn 4 | (4) | (8) | (12) | | | |

--- a2-b2-c2-d2 ⟶ | ⟵ d2-a1-b1-c1 ⟶

| | | | T3 | T4 | | |
|---|---|---|---|---|---|---|
| Dn 1 | | (4) | (8) | (12) | | |
| Dn 2 | (1) | (5) | (9) | (13) | | |
| Dn 3 | (2) | (6) | (10) | | | |
| Dn 4 | (3) | (7) | (11) | | | |

--- d2-a1-b1-c1 ⟶ | A1 c2-d2-a1-b1 ⟶

| | | | T5 | T6 | | |
|---|---|---|---|---|---|---|
| Dn 1 | | (3) | (7) | (11) | | |
| Dn 2 | | (4) | (8) | (12) | | |
| Dn 3 | (1) | (5) | (9) | (13) | | |
| Dn 4 | (2) | (6) | (10) | | | |

--- c2-d2-a1-b1 ⟶ | A2 b2-c2-d2-a1 ⟶

| | | | T7 | T8 | | |
|---|---|---|---|---|---|---|
| Dn 1 | | (2) | (6) | (10) | | |
| Dn 2 | | (3) | (7) | (11) | | |
| Dn 3 | | (4) | (8) | (12) | | |
| Dn 4 | (1) | (5) | (9) | (13) | | |

| | | | | | | | | | | |
|---|---|---|---|---|---|---|---|---|---|---|
| a0 | (1) | (5) | R | R | C | O | (10) | | | |
| b0 | (2) | (6) | R | R | C | O | (11) | | | |
| c0 | (3) | (7) | R | R | R | R | (12) | | | |
| d0 | (4) | (8) | R | R | R | (9) | (13) | | | |

CLKa ⎍⎍⎍         ⎍⎍⎍⎍⎍

| | | | | | | | | | | |
|---|---|---|---|---|---|---|---|---|---|---|
| a1 | | (1) | | (5) | | O | (10) | | | |
| b1 | | (2) | | (6) | | O | (11) | | | |
| c1 | | (3) | | (7) | | R | (12) | | | |
| d1 | | (4) | | (8) | | (9) | (13) | | | |

CLKb ⎍⎍⎍⎍      ⎍⎍⎍⎍

| | | | | | | | | | | |
|---|---|---|---|---|---|---|---|---|---|---|
| a2 | | | (1) | | (5) | | O | (10) | | |
| b2 | | | (2) | | (6) | | O | (11) | | |
| c2 | | | (3) | | (7) | | R | (12) | | |
| d2 | | | (4) | | (8) | | (9) | (13) | | |

CLKc ⎍⎍⎍⎍⎍    ⎍⎍⎍

| | | | | | | | | | | |
|---|---|---|---|---|---|---|---|---|---|---|
| a3 | | | | (1) | | (5) | | O | (10) | |
| b3 | | | | (2) | | (6) | | O | (11) | |
| c3 | | | | (3) | | (7) | | R | (12) | |
| d3 | | | | (4) | | (8) | | (9) | (13) | |

FORMAT CONVERTING SYSTEM FOR SYNCHRONOUS OPTICAL NETWORK

BACKGROUND OF THE INVENTION a. Field of the Invention

The present invention relates to a format converting system for a synchronous optical network, and more particularly, to a format converting system which converts a third-order group DS-3 signal into an STS-1 signal, of a synchronous optical network or vice versa.

b. Description of the Related Arts

A synchronous optical network (hereafter simply referred to as a SONET) is known as a synchronous transmission network. One frame of an STS-1 signal of the SONET consists of 6480 bits (=90 bytes×9 lines×8 bits). One frame is 125 μs and its bit rate is 51.84 Mb/s. Two bytes located at the head of the format are frame synchronizing patterns A1 and A2, and the subsequent one-byte is a channel discriminating pattern.

An STS-3 signal is formed by simply multiplexing three STS-1 signals for every byte, and has a bit rate of 155.52 Mb/s. Such an STS-3 signal is suitable for being transmitted as an optical signal. The STS-3 signal is standardized as an STM-1 signal by the CCITT recommendation. Further, a DS-1 signal formed by multiplexing audio (speech) data by 24 channels is standardized by the CCITT recommendation. The DS-1 signal consists of 193 bits per frame including frame bits, and the bit rate thereof is 1.544 Mb/s. The aforementioned DS-3 signal is formed by multiplexing the DS-1 signals, and has 672 channels and a bit rate of 44.736 Mb/s. It is demanded to convert the third-order group DS-3 signal into the STS-1 signal in conformity to the SONET system and transmit the same.

FIG. 1A illustrates the STS-1 signal of the SONET system. The STS-1 signal has a frame format 103, which consists of 90 bytes×9 lines×8 bits. The head of the frame is provided with two-bytes of frame synchronizing patterns A1 and A2, and a one-byte channel discriminating pattern C1. The frame format 103 includes a section overhead (SOH), a line overhead (LOH), and a pass overhead (POH). One frame of 810 bytes contains overheads of 36 bytes.

As described previously, the STS-1 signal of the SONET system has a bit rate of 51.84 Mb/s. When converting the format of the DS-3 signal having a bit rate of 44.736 Mb/s into the format of the STS-1 signal, it is necessary to execute a stuffing process because the bit rates thereof are different from each other. For example, some stuff bits are inserted into the third-order group DS-3 signal so that it has a frame structure 101 of 84 bytes×9 lines (L1–L9). As shown in FIG. 1A, the stuff bits to be inserted are fixed stuff bits R (normally "0"), stuff control bits C ("1" when stuffing, and "0" at the time of non-stuffing)zero bits 0 (normally "0"), and a variable slot bit S ("0" when stuffing, and data at the time of non-stuffing).

In FIG. 1, $t_1$–$t_{84}$ denotes time slots of lines L1–L9 in a case where one-byte is one time-slot, and 8R represents that the fixed stuff bits R are inserted by one byte (8 bits). Further, RRC represents that three bits consisting of two fixed stuff bits R and one stuff control bit C are inserted into time slot $t_3$. CC+6R represents that 8 bits consisting of two stuff control bits C and six fixed stuff bits R are inserted into time slot $t_{30}$. CCRROORS represents that 8 bits consisting of two stuff control bits C, two fixed stuff bits R, two zero bits 0 and one variable slot bit S are inserted into t slot $t_{58}$. Since one-bit data is placed in the position of the variable slot bit S when non-stuffing, the number of inserted bits in time slot $t_{58}$ is 8 when stuffing, and 7 when non-stuffing.

The pass overhead POH and the fixed stuff bits R are inserted into the frame structure 101 so that a frame structure 102 of 87 bytes×9 lines is formed. Further, overheads (SOH, LOH) of three bytes for each line is added to the frame structure 102 so that the STS-1 signal frame structures 103 of the SONET system of 90 bytes and 9 lines is formed.

When multiplexing three STS-1 signals in conformity with the SONET system to thereby form the STS-3 signal of the SONET system, a frame structure of 270 bytes×9 lines is obtained and frame synchronizing patterns A1 and A2 of six bytes and channel discriminating patterns C1 of three bytes are added to the head of the frame. The STS-3 signal having the above-mentioned structure corresponds to the STM-1 signal standardized by the CCITT recommendation.

It is conceivable to configure a format converting circuit for a mutual conversion between the STS-1 signal of the SONET system and the third-order group DS-3 signal by an emitter-coupled logic (ECL) circuit. As is well known, an ECL circuit operates at high speeds, but consumes a large amount of power. Thus, it is conceivable to configure such a format converting circuit by a complementary metal oxide semiconductor (CMOS) circuit. However, a CMOS circuit has an upper limit of operating speed equal to about 40 MHz. For this reason, a CMOS circuit cannot process the DS-3 signal and STS-1 signal with high stability.

From this point of view, it is conceivable to convert a serial signal into a plurality of signals in parallel so that the format converting circuit executes format conversion at a reduced speed. In a case where the DS-3 signal is converted into four parallel signals, each of the parallel signals has a bit rate of about 11 Mb/s. Thus, it becomes possible to employ a CMOS format converting circuit. In this case, stuff bits are inserted into the four parallel signals as shown in FIG. 1B, which illustrates an essential part of the line L1 of the aforementioned frame structure 101 shown in FIG. 1A. Particularly, FIG. 1B illustrates parts of the four parallel signals L11–L14 and stuff bits in time slots $t_1$–$t_{84}$.

As is shown in FIG. 1B, eight fixed stuff bits R are inserted into each of the time slots $t_1$ and $t_2$, and three bits conszisting of two fixed stuff bits R and one stuff control bit C are inserted into subsequent time slot $t_3$. The remaining five bits indicated by numerals 1–5 are data bits, Further, eight fixed stuff bits R are inserted into time slot $t_{29}$, and eight bits consisting of two stuff control bits C and six fixed stuff bits R are inserted into time slot $t_{30}$Subsequent time slot $t_{31}$ contains data bits 206–213. Eight fixed stuff bits R are inserted into time slot $t_{57}$, and eight bits consisting of two stuff control bits C, two fixed stuff bits R, two zero bits 0, one fixed stuff bit R and one variable slot bit S are inserted into time slot $t_{58}$ When stuffing, the variable slot bit S is inserted into time slot $t_{59}$. On the other hand, at the time of non-stuffing, the variable slot bit S is replaced by data bit 414, and time slot $t_{59}$ has data bits 415–422. When stuffing, data bits 414–421 are inserted into time slot $t_{59}$.

As a result, the last of line L1 is data bit 622 when non-stuffing and data bit 621 when stuffing. Thus, in time slot $t_3$ of line L2, the last data bit subsequent to the stuff control bit C is the first data bit 623 of line L2 or the last data bit 622 of line L1. That is, a simple format conversion from the DS-3 signal to the four parallel signals causes two different orders of data bits in a serial signal derived from the four parallel signals.

On the other hand, in the case where the format of the STS-1 signal of the SONET system is simply converted into that of the DS-3 signal, the DS-3 signal is converted into four parallel signals, and stuff bits are eliminated therefrom. Then the four parallel signals having no stuff bits are converted into a serial signal. In this case, there is a possibility that two different orders of data bits in the serial signal occur. For the above-mentioned reasons, it is demanded to realize format conversion implemented by a low-speed circuit such as a CMOS circuit without causing the erroneous order of data bits.

SUMMARY OF THE INVENTION

It is a general object of the present invention to provide a format converti system in which the aforementioned disadvantages are eliminated.

A more specific object of the present invention is to provide a format converting system capable of executing format conversion by a low-speed circuit without causing the erroneous order of data bits.

The above objects of the present invention are achieved by a format converting system comprising first converting unit, for converting an input signal into N parallel signals (N is an integer), each of the N parallel signals having a bit rate less than that of the input signal; latch units, operatively coupled to the first converting units, for temporarily latching the N parallel signals in accordance with a clock signal and for outputting a plurality of latched signals having a number larger than the N; selecting means, operatively coupled to latch units, for selectively outputting the latched signals from the latch unit and stuff bits to be inserted into the N parallel signals in accordance with a control signal so that N parallel output signals having the N parallel signal and the stuff bits are output from the selecting unit, the stuff bits being used for converting a frame format of the input signal into a different frame format; control unit, coupled to the latch means and the selecting unit, for generating the clock signal and generating the control signal which instructs the selecting unit to change an order of selecting the latched outputs and the stuff bits to thereby form the N parallel output signals when the number of the stuff bits to be inserted into the N parallel signals is not an integer multiple of N; and second converting unit, coupled to the selecting unit, for converting the N parallel output signals into a serial output signal having the different frame format.

The aforementioned objects of the present invention are also achieved by a format converting system comprising first converting unit for converting an input signal into M parallel signals (M is an integer) having stuff bits used for converting a frame format of the input signal into a different frame format, each of the M parallel signals having a bit rate less than that of the input signal; latch unit operatively coupled to the first converting unit for temporarily latching the M parallel signals in accordance with a clock signal and for generating latched signals having a number more than M; selecting unit operatively coupled to the latch unit, for selectively outputting the latched signals from the latch unit, in accordance with a control signal so that M parallel output signals obtained by eliminating the stuff bits from M the parallel signals are output from the selecting unit; control unit, coupled to the latch unit and the selecting unit for generating the clock signal and generating the control signal which instructs the selecting unit to change an order of selecting the latched outputs from the latch unit when the number of the stuff bits to be eliminated from the M parallel signals is not an integer multiple of M; and second converting unit, coupled to the selecting unit for converting the M parallel output signals from the selecting unit into a serial output signal having the different frame format.

Further objects, features and advantages of the present invention will become apparent from the following detailed description when read in conjunction with the accompanying drawings.

BRIEF DESCRIPTION OF THE DRAWINGS

FIG. 1A is a diagram illustrating the STS-1 signal;

FIG. 1B is a diagram illustrating the relationship between four parallel signals and bits inserted therein;

FIGS. 4A and 4B are diagrams illustrating how to control the order of data bits according to the present invention;

FIGS. 16 through 19 are respectively time charts illustrating the operation of the second embodiment shown in FIGS. 15A and 15B.

DESCRIPTION OF THE PREFERRED EMBODIMENTS

Figure 2:
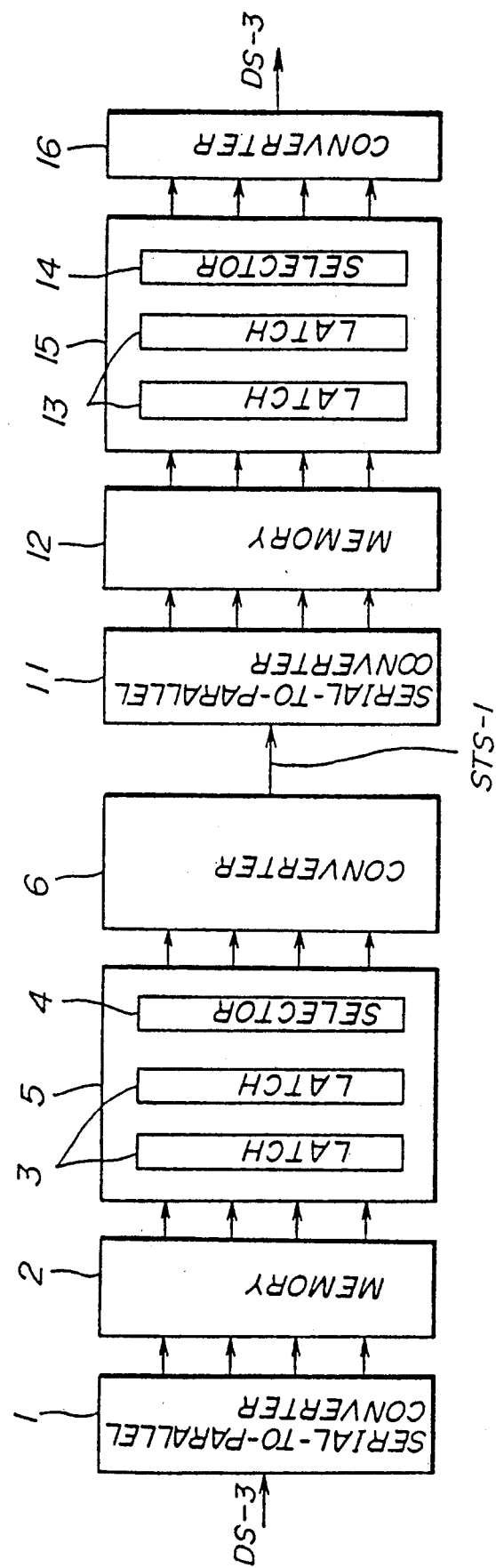
FIG. 2 is a diagram of the entire structure of the present invention.

A description is given of the entire structure of the present invention with reference to FIG. 2. According to the present invention, when the number of stuff bits to be inserted or eliminated is not an integer multiple of the number of parallel signals, the order of data bits is adjusted.

The illustrated structure relates to a case where the third-order group DS-3 signal is converted into the STS-1 signal in conformity with the SONET system and vice versa. Referring to FIG. 2, a serial-to-parallel converter (hereafter simply referred to an SP converter) 1 converts the DS-3 signal into N parallel signals (N is an arbitrary integer). A memory 2 stores the N parallel signals, which are written into and read out from the memory 2 in synchronism with individual clock signals on a conversion side. A mapping processor 5 is made up of a plurality of stages of latch circuits 3 and a selector 4. The mapping processor 5 executes a stuffing process in which stuff bits are inserted in the parallel signals. When the number of stuff bits to be inserted is not equal to an integer multiple of N, the selector 4 selectively supplies a converter 6 with the output signals from the latch circuits 3 so that the order of data bits in a serial signal generated by the converter 6 does not change from that of the DS-3 signal. The converter 6 further adds the overhead bytes to the serial signal so that the STS-1 signal is formed.

On a reception side, the STS-1 signal is converted into the DS-3 signal. A serial-to-parallel (SP) converter 11 eliminates the overhead bytes from the STS-1 signal and converts the STS-1 signal having no overhead bytes into M parallel signals (M is an arbitrary integer). A memory 12 temporarily stores the M parallel signals, which are written into and read out from the memory 12 in accordance with individual clock signals on a conversion side. A de-mapping circuit 15 is made up of a plurality of stages of latch circuits 13 and a selector 14. The latch circuits 13 sequentially latch the M parallel signals read out from the memory 12. The de-mapping circuit 15 executes a de-mapping process in which the stuff bits are eliminated from the M parallel signals. When the number of stuff bits to be eliminated is not equal to an integer multiple of M, the selector 14 selectively provides a converter 16 with the outputs from the latch circuits 13 so that the order of data bits in a serial signal generated by the converter 13 does not change from the original order of data bits of the DS-3 signal on the transmission side. Thereby, the DS-3 signal is output from the converter 16.

During operation, the SP converter 1 converts the DS-3 signal into, for example, four parallel signals, which are written into the memory 2 in synchronism with a write clock signal. The four parallel signals are read out from the memory 2 in synchronism with a read clock signal on the conversion side, and are then supplied to the mapping processor 5. The plurality of stages of the latch circuits 3 latch the four parallel signals in turn. During this operation, some stuff bits such as fixed stuff bits R are inserted into the four parallel signals in accordance with the stuffing process. The latch timing is controlled in accordance with timing of inserting the stuff bits.

When the number of stuff bits to be inserted is not an integer multiple of N, the selector 4 is controlled so that the output signals from the latch circuit 3 are selectively switched. For example, referring to FIG. 1B, in the case where data bits of the four parallel signals L11-L14 are 414-417, when stuffing is not performed and data bit 417 is replaced by the variable slot bit S in time slot t, the four parallel signals in time slot $t_{59}$ are 414, 415, 416 and 417. When they are converted into a serial signal, the order of data bits changes. From this viewpoint, the selector 4 is controlled that data bit 414 is selectively output in the position of the variable slot bit S. In this case, the selector 4 selects the four parallel signals in order of L11→L14, L12→L11, L13 →L12, and L14→L13.

When the STS-1 signal is converted into the DS-3 signal, the STS-1 signal is converted into M parallel signals, for example, four parallel signals, which are then written into the memory 12 in synchronism with a write clock signal. The four parallel signals are read out from the memory 12 in synchronism with a read clock signal on the conversion side, and then input to the de-mapping processor 15. The parallel signals read out are latched by the latch circuits 13 and selectively output from the selector 14. When stuff bits are eliminated from the selector 14, if the number of stuff bits to be eliminated is not an integer multiple of M, the bit selecting procedure of the selector 14 is switched so that a serial signal from the parallel signals has an order of data bits which is the same as the original DS-3 signal.

Figure 3:
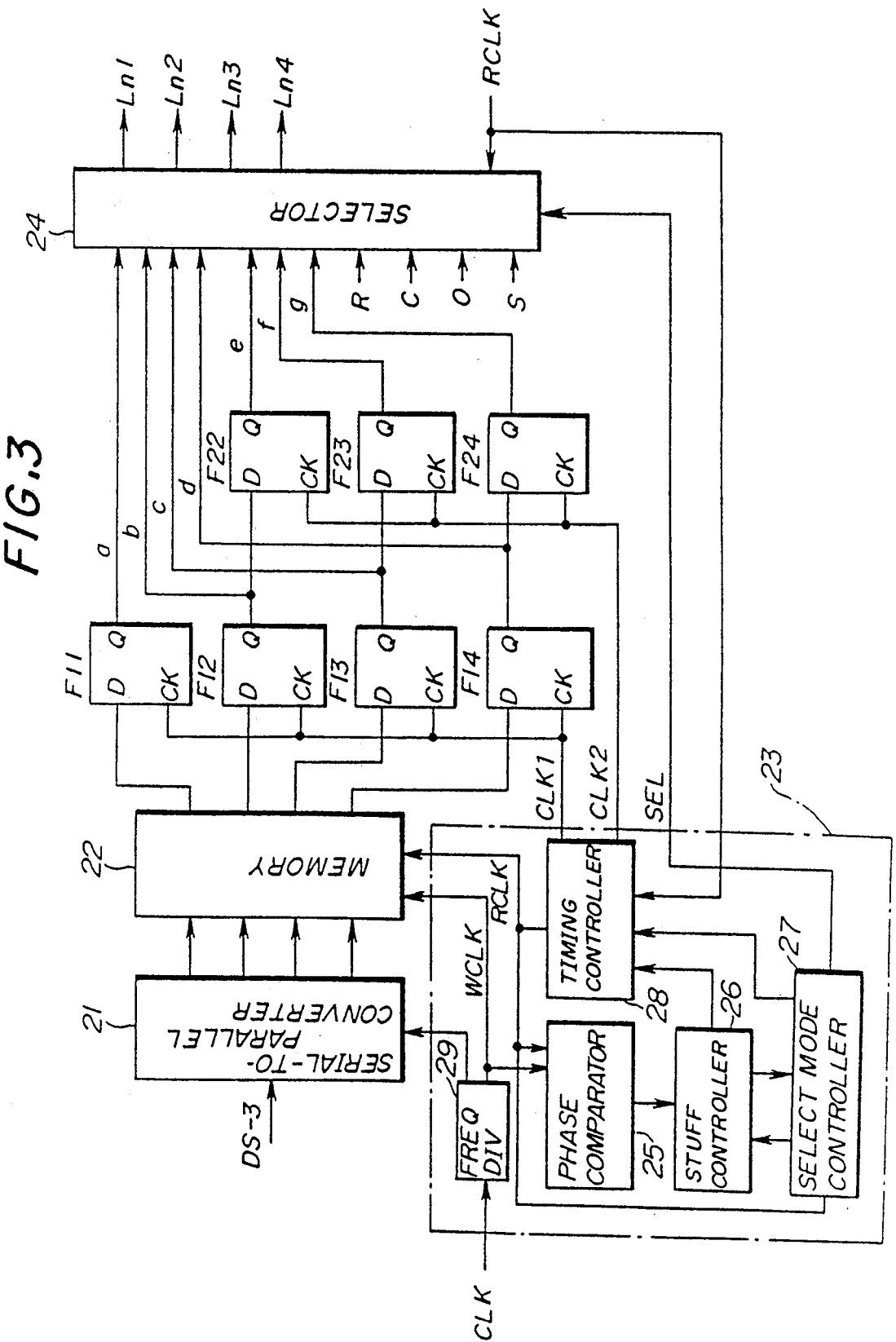
FIG. 3 is a diagram of a transmission-side configuration according to a first preferred embodiment of the present invention.

A description is given of a preferred embodiment of the present invention. Referring to FIG. 3, there is illustrated a configuration on the transmission side according to the first embodiment of the present invention. The illustrated configuration relates to a case where the third-order group DS-3 signal to be converted into the STS-1 signal in conformity with the SONET system is converted into four parallel signals (N =4), which are then subjected to the mapping process. The configuration on the transmissions side includes a serial-to-parallel (SP) converter 21, a memory 22, a control circuit 23, a selector 24 and flip-flops F11-F14 and F22-F24, which form the aforementioned latch circuits 3. The control circuit 23 is composed of a phase comparator 25, a stuff controller 26 a select mode controller 27, a timing controller 28 and a frequency divider 29. A clock signal CLK supplied from an external circuit (not shown) is frequency-divided by the frequency divider 29, which generates a write clock signal WCLK having a frequency, for example, equal to a quarter of the frequency of the clock CLK. The write clock signal WCLK from the frequency divider 29 is supplied to the SP converter 21 and the memory 22. A read clock signal RCLK supplied from the external circuit is supplied to the selector 24, and the memory 22 through the timing controller 28. The phase comparator 25 compares the phase of the write clock signal WCLK with the phase of the read clock signal RCLK, and determines whether the phase of the write clock signal WCLK is close to the phase of the read clock signal RCLK, or in other words, a write address of the memory 22 is close to a read address thereof. When it is determined that the phase of the write clock signal WCLK is close to the phase of the read clock signal RCLK, the phase comparator 25 activates the stuff controller 26, which executes a stuffing process in which the aforementioned variable slot bit S is inserted. The timing controller 28 outputs the read clock signal RCLK and clock signals CLKI and CLK2, which have the same frequency. The timing controller 28 is controlled by the stuff controller 26 and the select mode controller 27. The select mode controller 27 executes a select mode control (mapping control) by which the selector 24 is controlled.

Figure 1B:
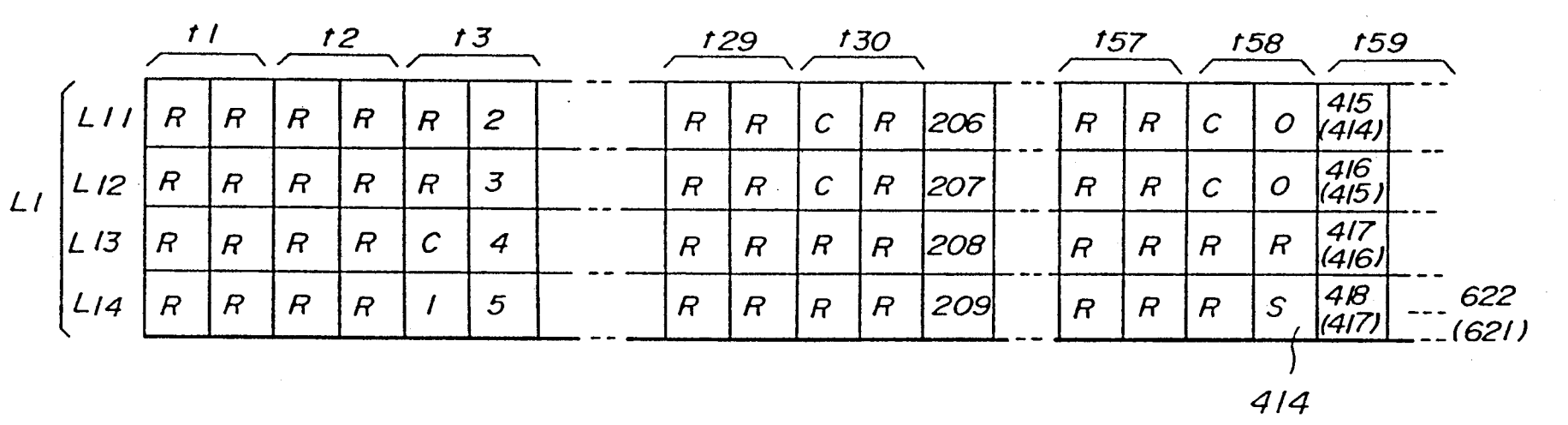
Figure 4A:
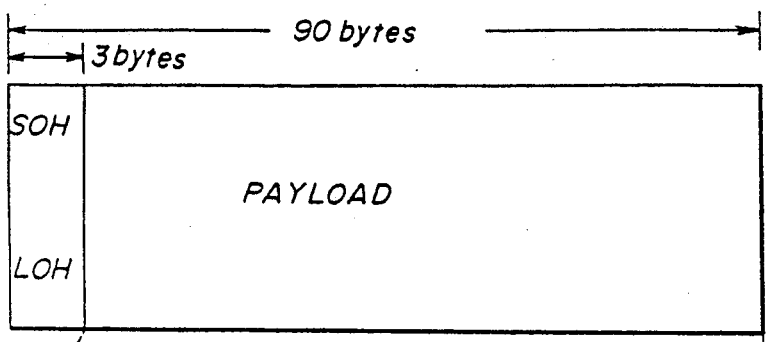
Figure 4A:
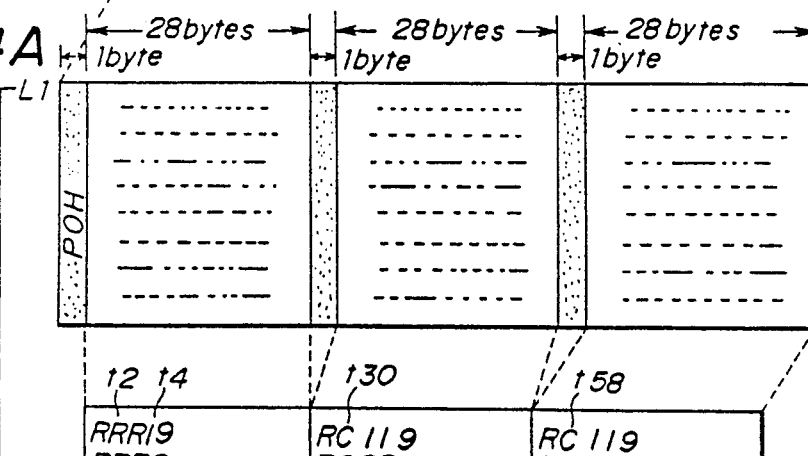
Figure 4A:
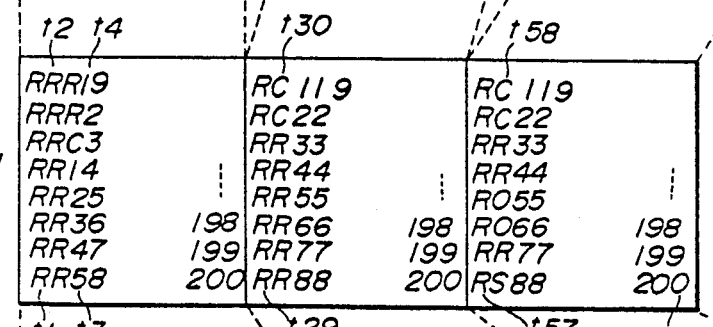
Figure 4A:
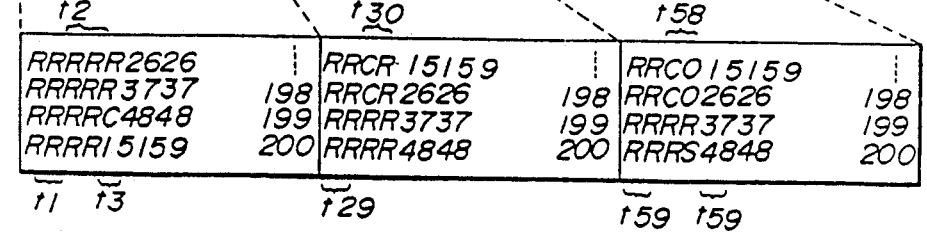

FIG. 4A is a diagram corresponding to a combination of FIGS. 1A and 1B. FIG. 4A(a) shows the frame format of the STS-1 signal, and FIG. 4A(b) shows a payload portion of the STS-1 signal. FIG. 4A(c) shows the line L1 of the payload portion, and FIG. 4A(d) shows the line L1 obtained by rearranging 8-parallel data of the line L1 shown in FIG. 4A(c) in 4-parallel data.

FIG. 4B(a) shows a data sequence of a line (frame) at the output of the converter 21 (FIG. 3), FIG. 4B(b) shows a corresponding data sequence at the output of the selector 24 when C=0 (non-stuffing), and FIG. 4B(c) shows a corresponding data sequence at the output of the selector 24 when C=1 (stuffing). The data sequence obtained at the output of the selector 24 is composed of three sets of SET1, SET2 and SET3. At the time of non-stuffing, the order of data bits shifts by one bit in a position in the set SET1 indicated by a symbol *, and shifts by one bit in a position in the set SET3 indicated by a symbol * (FIG. 4B(b)). That is, the order of data bits shifts two times per frame. When the order of data bits shifts by one bit four times, the order of data bits returns to the original order. At the time of stuffing, the order of data bits shifts by one bit in a position in the data set SET 1 indicated by * (FIG. 4B(c)). The order of data bits shift by one bit per frame. When the order of data bits shifts by one bit four times, the order of data bits returns to the original order.

The select mode controller 27 includes first and second program counters. The first counter counts the read clock signal RCLK and determines which data bits are being processed (or which one of the time slots being processed). The second counter determines how many times the one-bit data bit shift occurs. The select mode controller 27 controls four different select modes MODE 1, MODE 2, MODE 3 and MODE 4 based on the number of times that the one-bit data shift occurs. The select mode controller 27 executes a mode select control (mapping control) procedure shown in FIG. 5.

Figure 5:
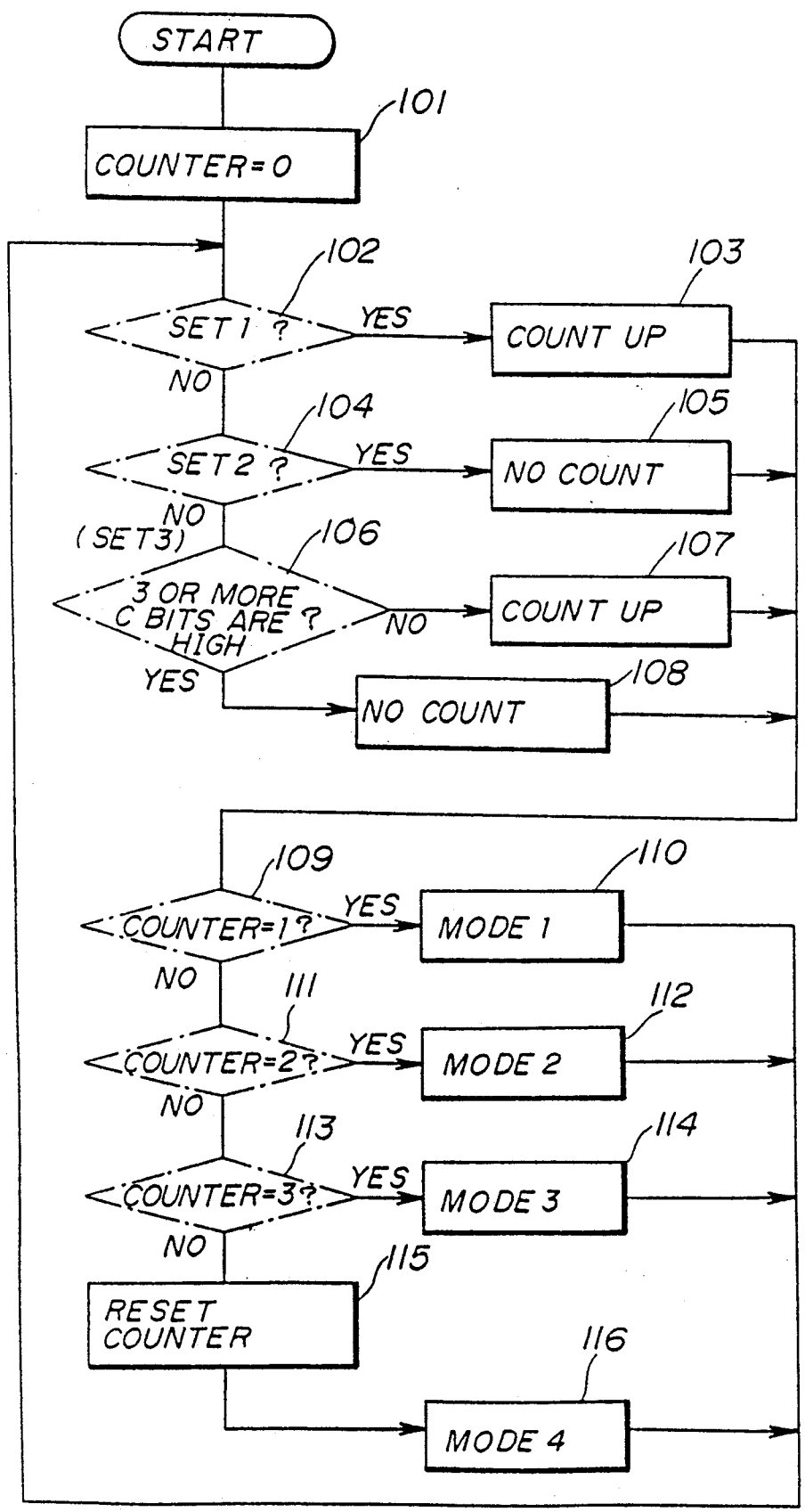
FIG. 5 is a flowchart of a mode selecting control (mapping control) procedure which is executed by a select mode controller shown in FIG. 3.

Referring to FIG. 5, the value in the second counter is reset to 0 (step 101). When it is determined whether or not the current data bits read out from the memory 22 relate to the data set SET1 (step 102) on the basis of the current value of the first counter. When the result of step 102 is YES, the second counter is incremented by +1 (step 103). On the other hand, when the result of step 102 is NO, the control proceeds to step 104, which determines whether or not the current data bits read out from the memory 22 relate to the data set SET2. When the result of step 104 is YES, the value in the second counter is held as it is (step 105). On the other hand, when the result of step 104 is NO, the control proceeds to step 106, which determines whether or not the number of C bits contained by five bits per frame is equal to, or more than 3. For this determining step, data bits are supplied to the select mode controller 27 through data lines (not shown for the sake of simplicity). When the result of step 106 is NO, it is determined that the data bits being processed relate to the data set SET3 obtained at the time of non-stuffing. Thus, the value in the second counter is incremented by +1 (step 107). On the other hand, when the result of step 106 is YES, it is determined that the data bits being processed relate to the data set SET3 obtained at the time of stuffing. Thus, the value in the second counter is held at it is (step 108).

Control then proceeds to step 109, which determines the value in the second counter is equal to 1. When the result of step 109 is YES, the select mode MODE 1 is selected (step 110) so that the select mode controller 27 controls the selector 24 in accordance with the select mode MODE 1. Then the control returns to step 102. When the result of step 109 is NO, the control proceeds to step 111, which determines whether the value in the second counter is equal to 2. When the result of step 111 is YES, the select mode MODE 2 is selected (step 112) so that the select mode controller 27 controls the selector 24 in accordance with the select mode MODE 2. Then the control returns to step 102. On the other hand, when the result of step 111 is NO, the control proceeds to step 113, which determines whether or not the value in the second counter is equal to 3. When the result of step 113 is YES, the select mode MODE 3 is selected (step 114) so that the select mode controller 27 controls the selector 24 in accordance with the select mode MODE 3. Then the control returns to step 102. On the other hand, when the result of step 113 is NO, the control proceeds to step 115, which resets the second counter to zero. Then the select mode MODE 4 is selected (step 116) so that the mode select controller 27 controls the selector 24 in accordance with the select mode MODE 4. Then the control returns to step 102.

Turning to FIG. 3, the DS-3 signal is supplied to the SP converter 21, and the clock signal CLK synchronized to the DS-3 signal is supplied to the control circuit 23. The SP converter 21 converts the DS-3 signal into four parallel signals, which are supplied to the memory 22. The four parallel signals are written into the memory 22 in synchronism with the write clock signal WCLK, and are read out therefrom in accordance with the read clock signal RCLK.

The four parallel signals read out from the memory 22 are latched by the flip-flops F11-F14 in synchronism with the clock signal CLK1. Output signals a, b, c and d drawn from the Q terminals of the flip-flops F11-F14 are supplied to the selector 24. The output signals b, c and d from the flip-flop F12, F13 and F14 are latched by the flip-flops F22-F24 in synchronism with the clock signal CLK 2. Output signals e, f, and g of the flip-flops F22, F23 and F24 drawn from the Q terminals thereof are supplied to the selector 24.

The timing controller 28 of the control circuit 23 controls the read clock signal RCLK as well as clock signals CLK1 and CLK2 so that bits are inserted in time slots $t_1-t_3$, $t_{29}$, $t_{30}$, $t_{57}$ and $t_{58}$. The phase comparator 25 compares the phase of the write clock signal WCLK and the phase of the read clock signal RCLK. When the phases of the write and read clock signals WCLK and RCLK becomes close to each other, or when the read address becomes close to the write address, the stuffing controller 26 executes the stuffing process in which the variable slot bit S is inserted.

The selector 24 is supplied with the fixed stuff bit R, the stuff control bit C, the zero bit 0 and the variable slot bit S in addition to the aforementioned output signals a through g. The selector 24 is controlled by a select control signal SEL supplied from the select mode controller 27 of the control circuit 23, and outputs four parallel signals Ln1-Ln4, which are supplied to the converter 6 (FIG. 3). The converter 6 converts the four parallel signals Ln1-Ln4 into a serial signal and adds the overhead bytes to the serial signal so that the STS-1 signal is generated.

FIG. 6 through FIG. 14 illustrate the operation of the embodiment of the present invention. In these figures, "a'" denotes an output signal supplied from the Q terminal of a flip-flop F21 (not shown in FIG. 3) which latches the output signal a from from the flip-flop F11.

Figure 6:
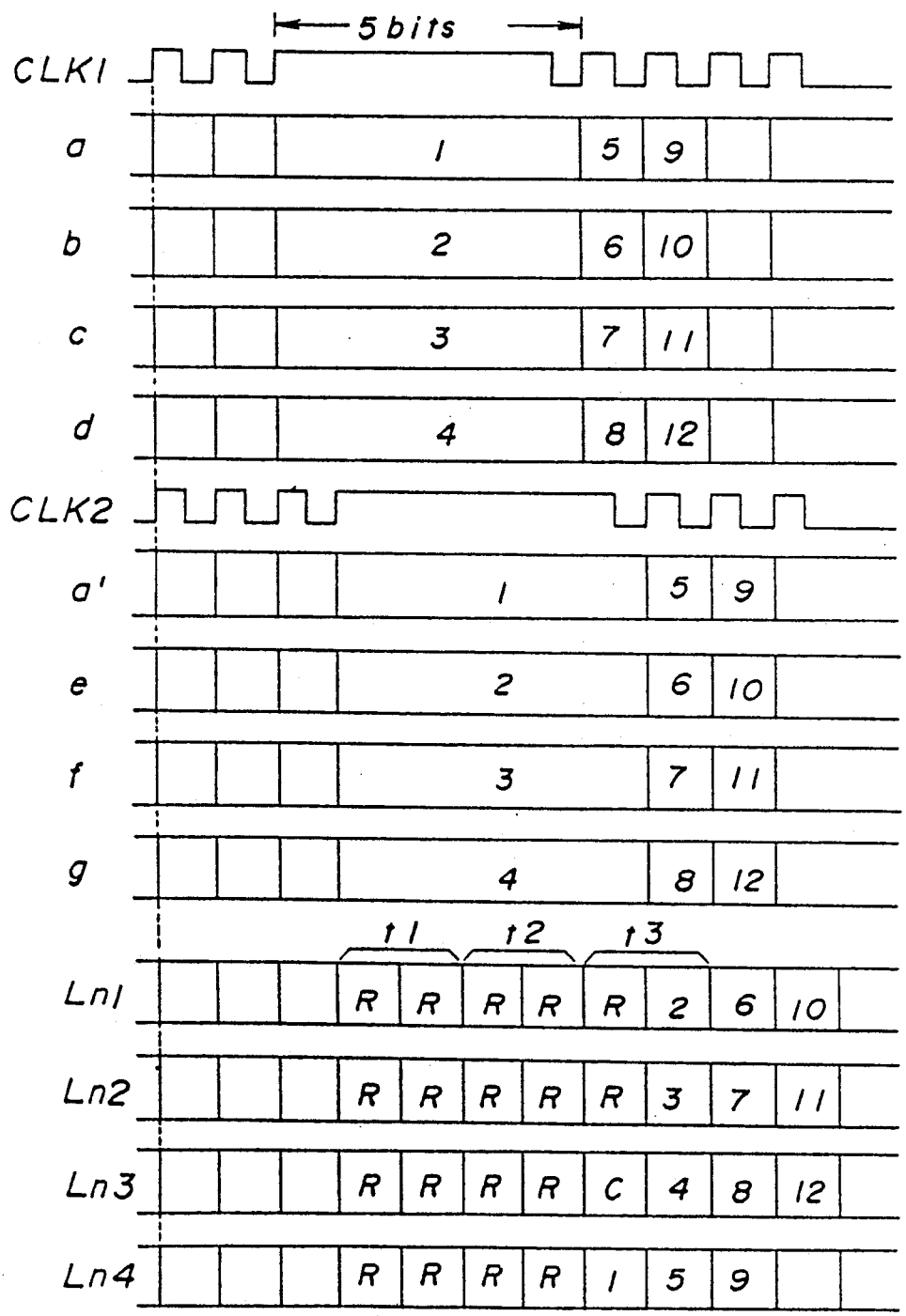
FIGS. 6 through 14 are respectively time charts illustrating the operation of the embodiment shown in FIG. 3.

FIG. 6 illustrates the operation relating to time slots $t_1-t_3$. The four parallel signals read out from the memory 22 are applied to data input terminals D of the flip-flops F11-F14 and latched therein in synchronism with the clock signal CLK1. The clock signal CLK2 lags behind the clock signal CLK1 by one bit. In order to insert 18 fixed stuff bits R and one stuff control bit C, when data bits 1-4 are read out from the memory 22 and latched by the flip-flops F11-F14, the supply of the clock signal CLK1 is stopped during a time equal to five bits, and the supply of the clock signal CLK2 is also stopped during a time equal to five bits. Thereby, data bits 1-4 are held in the flip-flops F11-F14 and F21-F24.

In this case, the total number of stuff bits to be inserted is 19, which is not a integer multiple of the number of the parallel signals (N=4). Further, the data set SET1 is being processed. Thus, the aforementioned second counter is incremented by +1 (step 103 shown in FIG. 5), and the select control signal SEL from the select mode controller 27 sets the selector 24 to the aforementioned select mode MODE 1. That is, the selector 24 outputs the output signals a-d from the flip-flops F11-F14 so as to correspond to the parallel signals Ln1-Ln4. Then in time slot t, the selector 24 selectively assigns the fixed stuff bits R to the signals Ln1 and Ln2, outputs the stuff control bit C to the signal Ln3 and assigns the output signal a from the flip-flop F11 to the signal Ln4. Then the selector selects the output signals e, f, g and a to the signals Ln1, Ln2, Ln3 and Ln4, respectively. As a result of the selective switching in the MODE 1, a serial signal derived from the four parallel signals Ln1-Ln4 has an order of R, R, C, 1, 2, 3 and 4. That is, the order of bits in the DS-3 signal is maintained in the serial 1 signal converted from the four parallel signals Ln1-Ln4.

Figure 7:
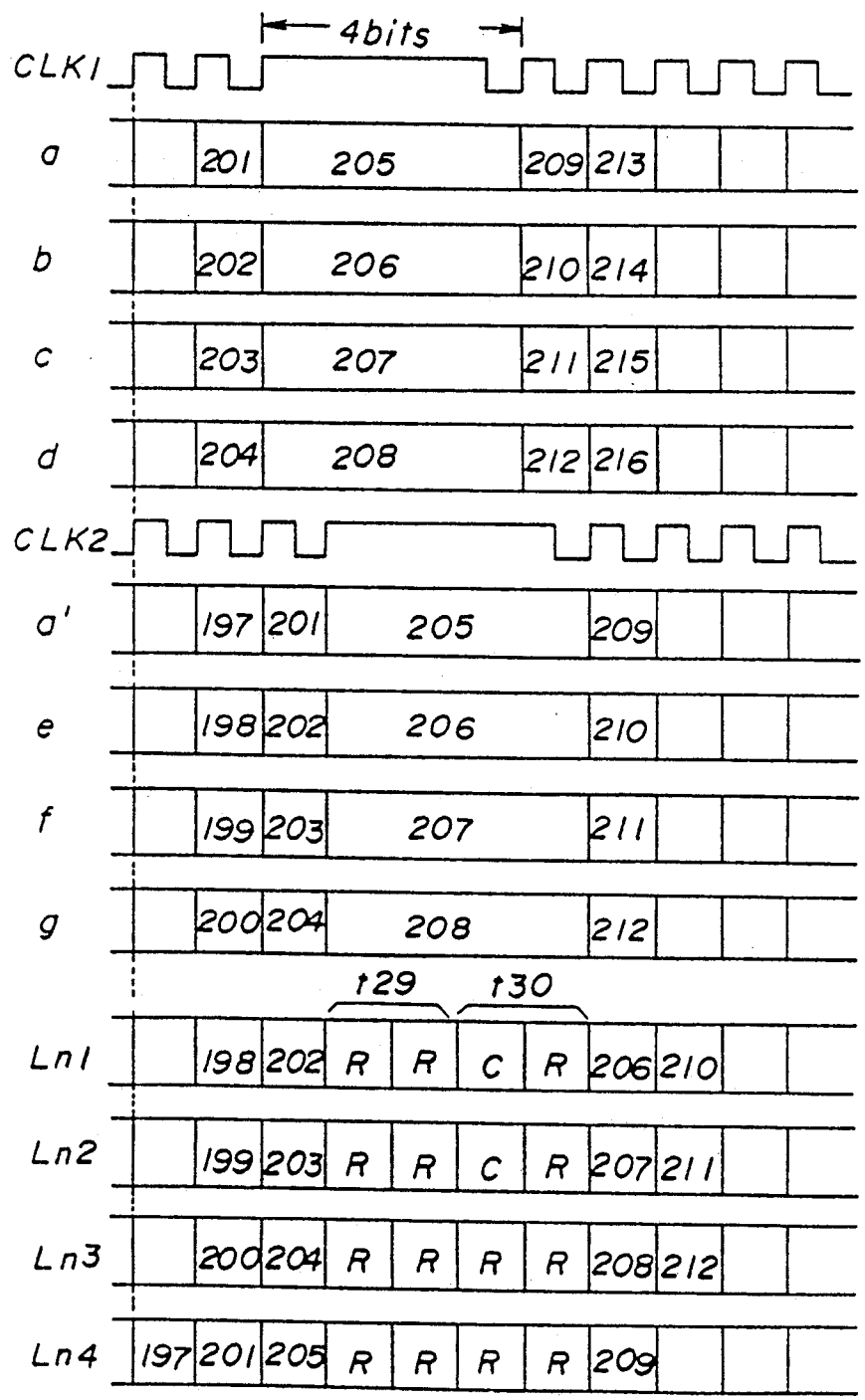

FIG. 7 is a time chart of signals relating to time slots $t_{29}$ and $t_{30}$. In order to insert 14 fixed stuff bits R and two stuff control bits C, when data bits 205-208 are read out from the memory 22 and latched by the flip-flops F11-F14, the supply of the clock signal CLK1 is stopped during a time equal to four bits. When the output signals a-d (data bits 205-208) from the flip-flops F11-F14 are latched by the flip-flops F21-F24, the supply of the clock signal CLK2 is stopped during a time equal to four bits.

While the supply of the clock signals CLK1 and CLK2 are being stopped, the selector 24 selectively outputs the 14 fixed stuff bits R and the two stuff control bits C in accordance w select control signal SEL. In this case, the total number of stuff bits to be inserted are 16, which is an integer multiple of the number of the parallel signals (N=4). Further, it is determined at step 104 (FIG. 5) that the data set SET2 is being processed and thus the second counter is not incremented (step 105). Thus, the selector 24 maintains the previous state of the order of bits, i.e., the MODE 1. That is, the selector 24 continues to assign outputs e, f, g and a to the signals Ln1, Ln2, Ln3 and Ln4, respectively.

Figure 8:
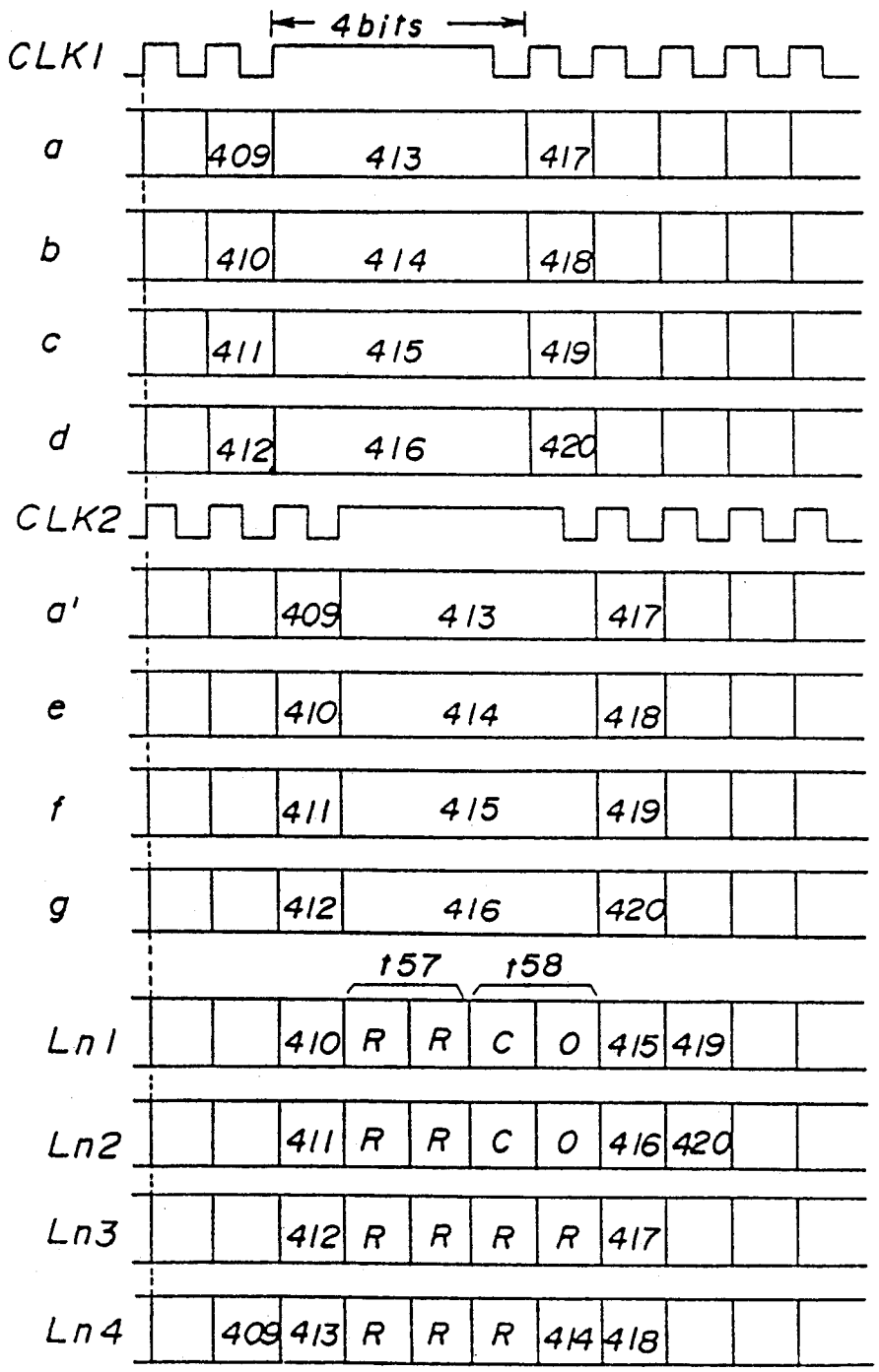

FIG. 8 is a timing chart of signals which are in time slots $t_{57}$ and $t_{58}$. In order to insert 11 fixed stuff bits R, two stuff control bits C and two 0 bits 0, when data bits 413-416 are read out from the memory 22 and latched by the flip-flops F11-F14, the supply of the clock signal CLKI is stopped during a time equal to four bits. When the outputs a-d (data 413 416) from the flip-flops F11-F14 are latched by the flip-flops F21-F24, the supplY of the clock signal CLK2 is stopped during a time equal to four bits.

While the supply of the clock signals CLK1 and CLK2 are being stopped, the selector 24 selectively outputs the 11 fixed stuff bits R, the two stuff control bits C and the two zero bits 0 in accordance with the select control signal SEL. When the stuffing is unnecessary (non-stuffing), a data bit is placed in the position of the variable slot bit S. In this case, the total number of stuff bits inserted is 15, which is not an integer multiple of the number of the parallel signals (N=4) and the result of step 106 (FIG. 5) is negative. Thus, the second counter is incremented by +1 (step 107) and step 112 is executed. Thereby, the selecting order of the selector 24 is changed so that it is switched from the current select mode MODE 1 where output signals e, f, g and a are assigned to the signals Ln1, Ln2, Ln3 and Ln4 respectively, to the select mode MODE 2 where outputs f, g, a and b are assigned to Ln1, Ln2, Ln3 and Ln4, respectively. It is noted that data bit 414 is selectively output to the position of the variable slot bit S. A serial signal converted from the four parallel signals Ln1-Ln4 has the order of 0, 0, R, 414, 415, 416, 417 and 418 at the latter half of time slot t and the former half of time slot $t_{58}$, and thus the order of data bits are maintained correctly.

Figure 9:
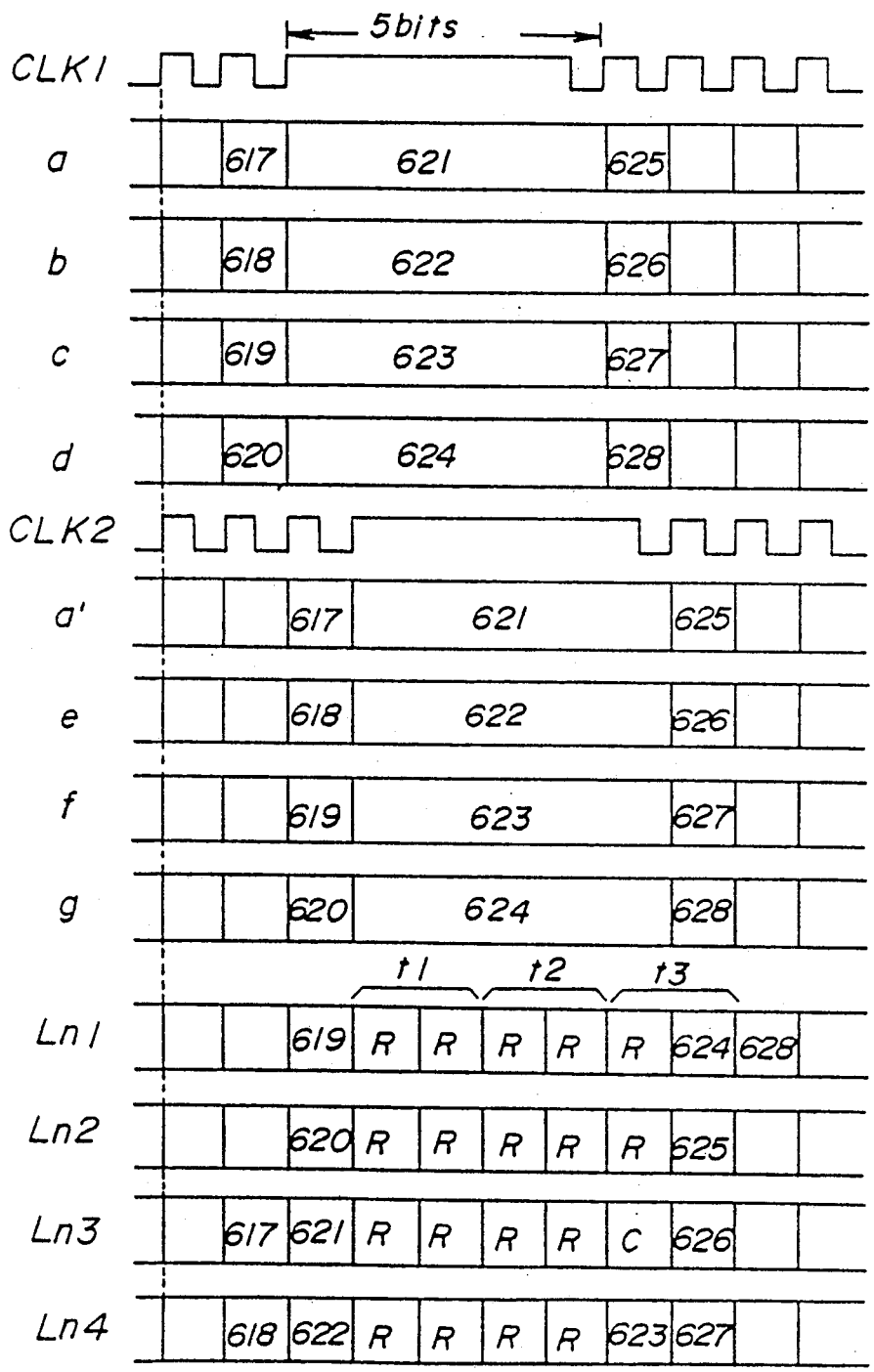
Figure 10:
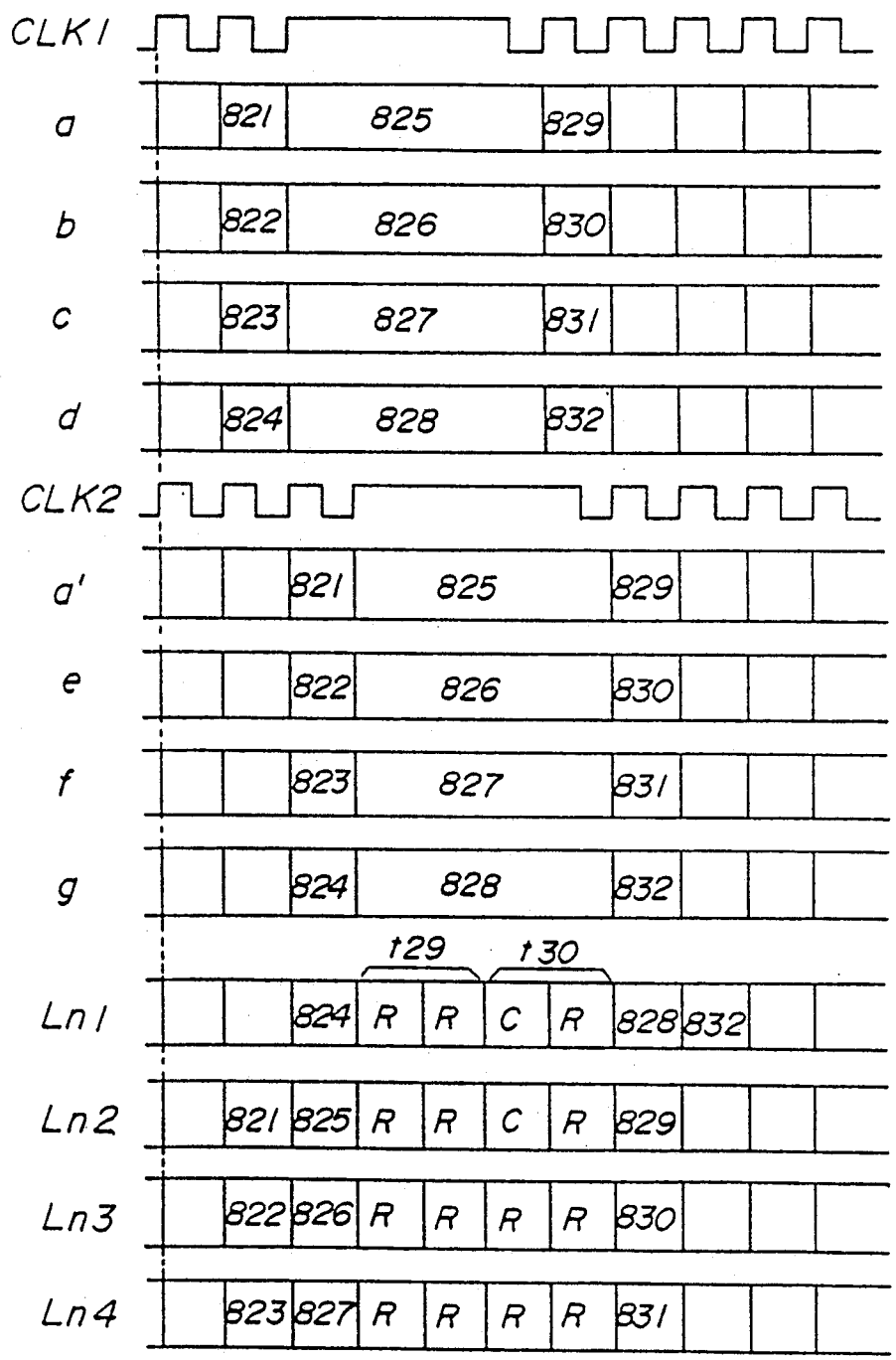

FIG. 9 is a time chart of signals relating to time slots $t_1$-$t_3$. When data bits 621-625 are latched by the flip-flops F11-F14, the supply of the clock signal CLK1 is stopped during a time equal to five bits. As in the case shown in FIG. 6, stuff bits are inserted. In this case, since the number of stuff bits inserted is not an integer multiple of the number of the parallel signals (N=4) and the result of step 102 is YES, the second counter is incremented by +1. Thereby at step 114, the select mode of the selector 24 is changed from the current select mode MODE 2 where the output signals e, f, g and a are assigned to the signals Ln1, Ln2, Ln3 and Ln4 respectively, to the select mode MODE 3 where the outputs signals g, a, b and c are assigned to the signals Ln1, Ln2, Ln3 and Ln4, respectively. As a result, a serial signal converted 20 from the signals Ln1-Ln4 has the order of R, R, C, 623, 624, 625, 626 and 627 in time slot $t_3$ FIG. 10 is a time chart of signals relating to slots $t_{29}$ and $t_{30}$. When data bits 825-828 are latched by the flip-flops F11-F14, the supply of the clock signal CLK1 is stopped during a time equal to four bits. As in the case shown in FIG. 7, 16 stuff bits consisting of 14 fixed stuff bits R and two stuff control bits C are inserted. The number of stuff bits to be inserted is an integer multiple of the number of the parallel signals (N=4). Thus, the selector 24 is maintained in the previous select mode, that is, the MODE 3.

Figure 11:
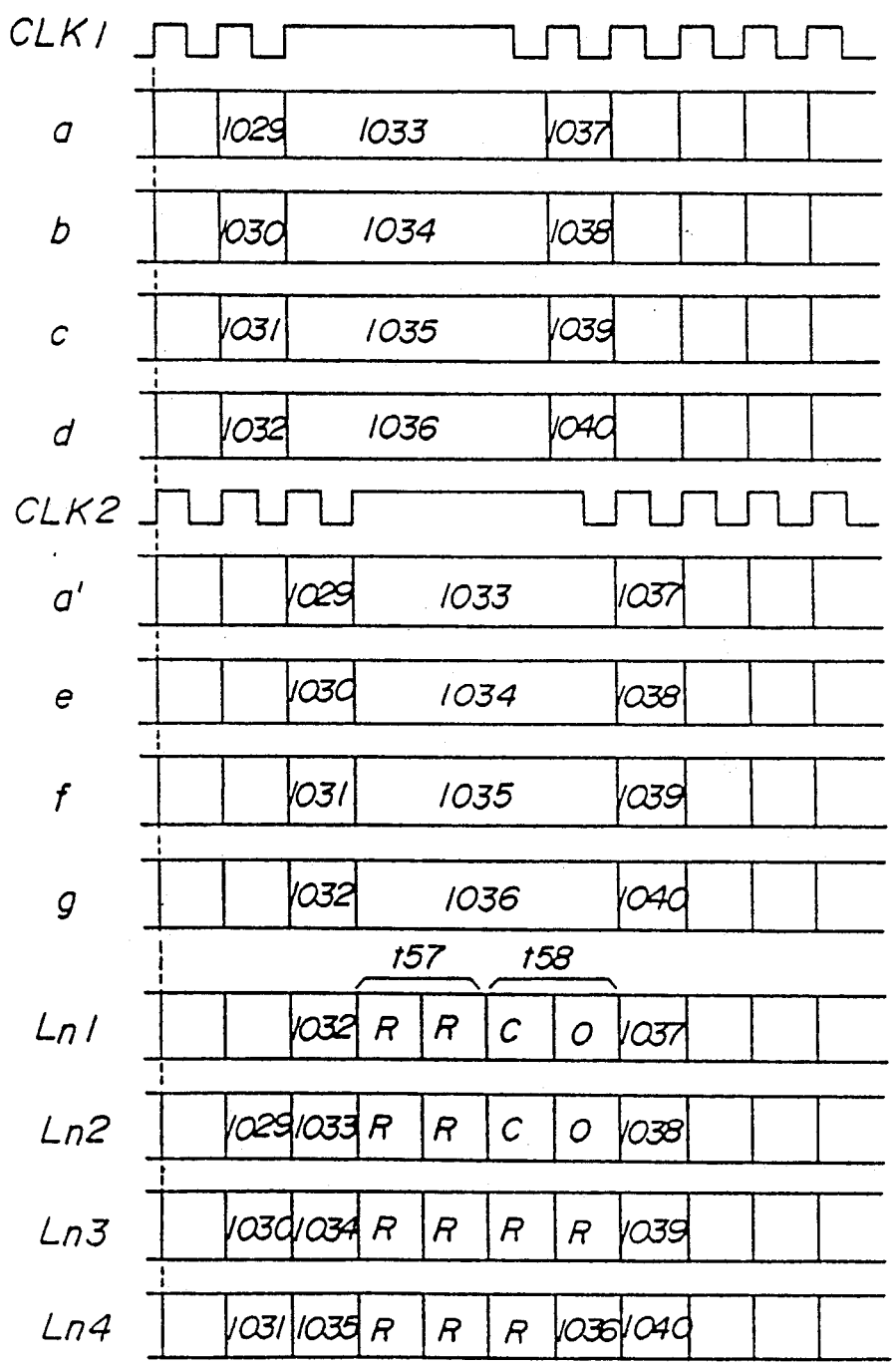

FIG. 11 is a time chart of signals relating to time slots $t_{57}$ and $t_{58}$. When data bits 1033-1036 are latched by the flip-flops F11-F14, the supply of the clock signal CLK1 is stopped during a time equal to four bits. As in the case shown in FIG. 8, 15 stuff bits consisting of 11 fixed stuff bits R, two stuff control bits C and two zero bits 0 are inserted. In this case, the number of stuff bits to be inserted is not equal to an integer multiple of the number of the parallel signals N, and the result of step 106 is negative at the time of stuffing. Thus, the second counter is reset to zero at step 115. Then, as in the case shown in FIG. 8, the select mode of the selector 24 is changed, at step 116, from the select mode MODE 3 where the outputs g, a, b and c are assigned to the signals Ln1, Ln2, Ln3 and Ln4 respectively, to the select mode MODE 4 where the output signals a, b, c and d are assigned to the signals Ln1, Ln2, Ln3 and Ln4, respectively.

Figure 12:
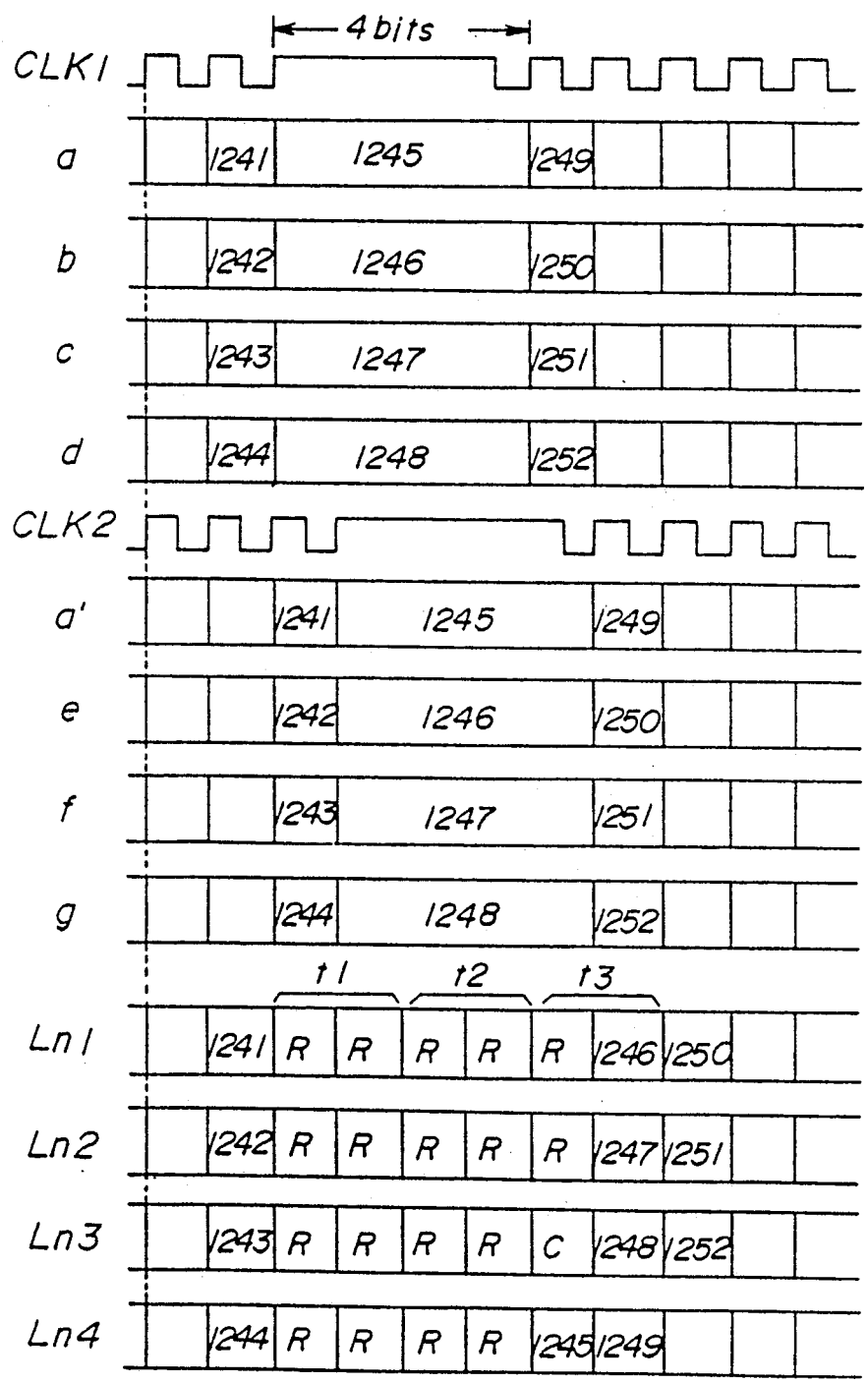

As a result, the selector 24 returns to the initial (first) select mode. FIG. 12 is a time chart of signals relating to to time slots $t_1$-$t_3$, when data bits 1245-1248 are latched by the flip-flops F11-F14, the supply of the clock signal CLK1 is stopped during a time equal to four bits. During this time, 16 fixed stuff bits R and one stuff control bit C are inserted. In this case, the number of stuff bits to be inserted is not an integer multiple of the number of the parallel signals (N=4). Thus, as in the case shown in FIG. 6, the select mode of the selector 24 is changed from the select mode MODE 4 where the output signals a, b, c and d are assigned to the signals Ln1, Ln2, Ln3 and Ln4 respectively to the select mode MODE 1 where the output signals e, f, g and a are assigned to the signals Ln1, Ln2, Ln3 and Ln4, respectively.

Figure 13:
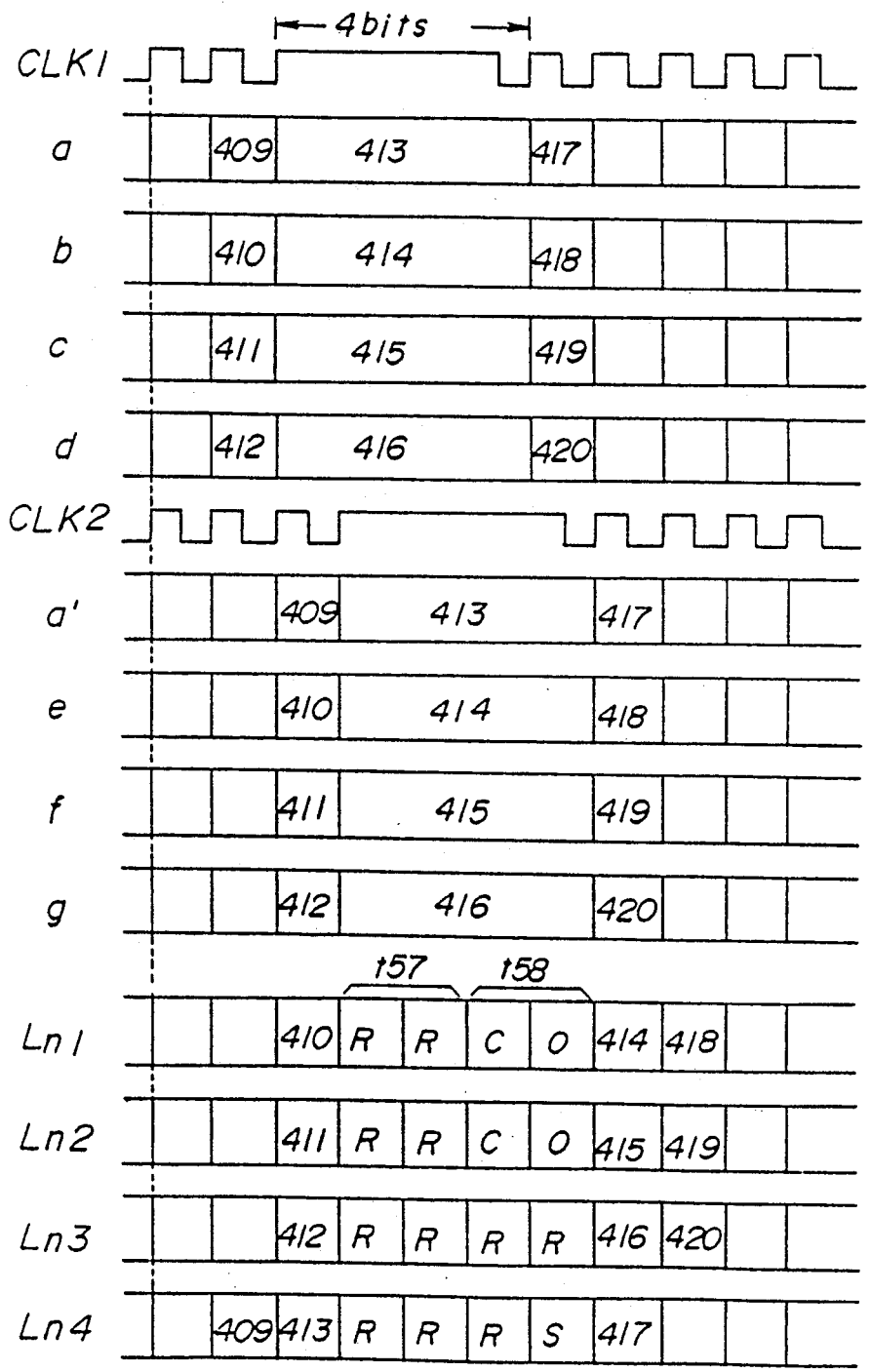

FIG. 13 is a time chart of signals relating to time slots $t_{57}$ and $t_{58}$ at the time of stuffing.

When data bits 413-416 are latched by the flip-flops F11-F14, the supply of the clock signal CLK1 is stopped during a time equal to four bits. During this time, 16 stuff bits consisting of 11 fixed stuff bits R, two stuff control bits C, two zero bits 0 and one variable slot bit S are inserted. In t case, the number of stuff bits inserted is an integer multiple of the number of the parallel signals (N=4). Thus, the select mode of the selector 24 is maintained at the current select mode as it is (step 105 shown in FIG. 5).

Figure 14:
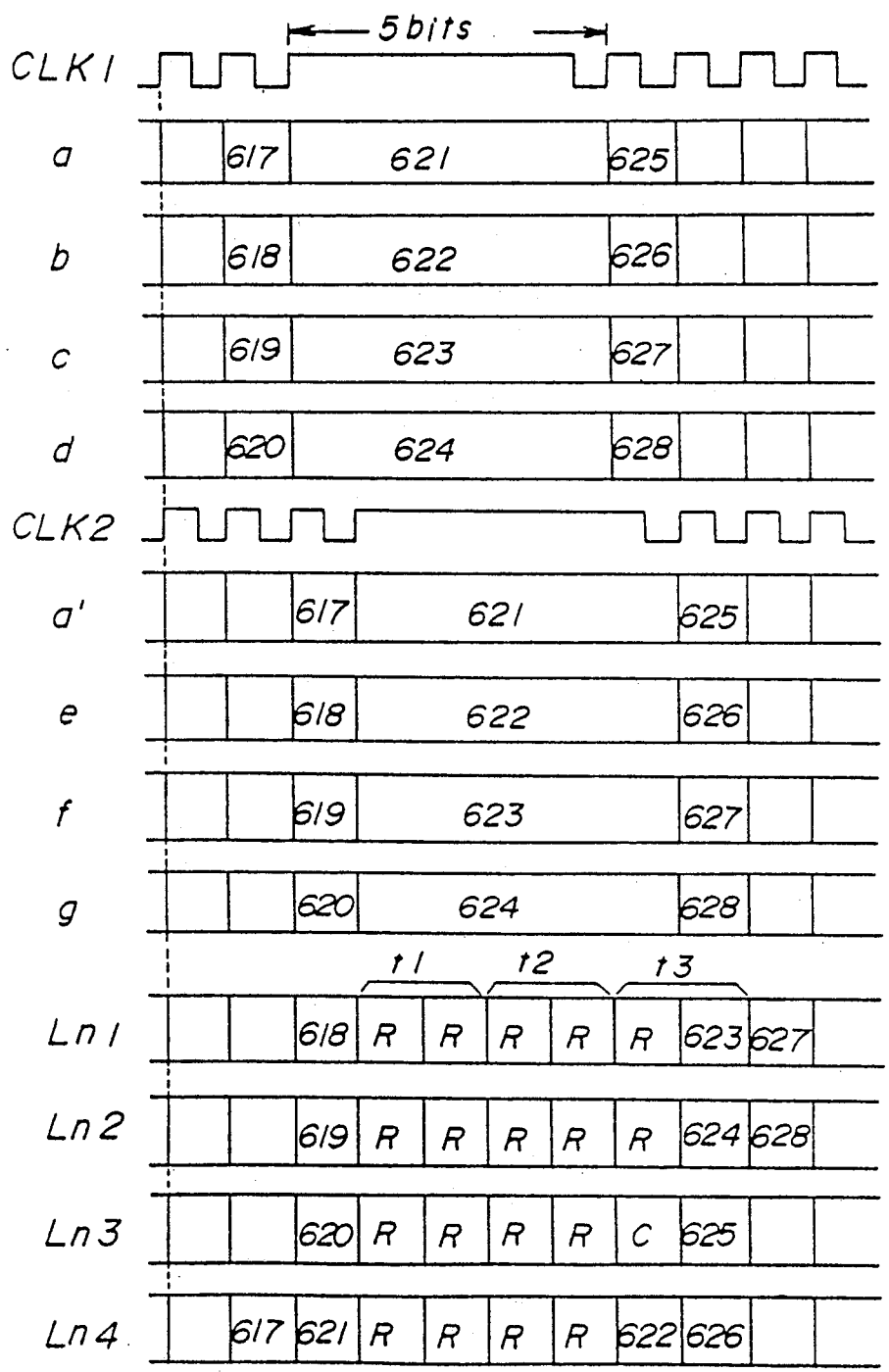

FIG. 14 is a time chart of signals relating to time slots tl-t₃ at the time of stuffing. As in the case of FIG. 8, when data bits 621-624 are read out from the memory 22 and latched by the flip-flops F11 F14, the supply of the clock signal CLK1 is stopped during a time equal to five bits. During this time, 19 stuff bits are inserted. In this case, the number of stuff bits inserted is not an integer multiple of the number of the parallel signals (N=4) and the result of step 102 (FIG. 5) is affirmative. Thus the select mode of the selector 24 is switched from the current select mode MODE 1 where the output signals e, f, g and a are assigned to the signals Ln1, Ln2, Ln3 and Ln4 respectively to the select mode MODE 2 where the output signals f, g, a and b are assigned to the signals Ln1, Ln2, Ln3 and Ln4, respectively.

As described previously, the select mode of the selector 24 is controlled by the select control signal SEL supplied from the select mode controller 27 of the control circuit 23 so that the serial signal derived from the parallel signals has the order of data bits which is the same as the DS-3 signal. Thus, it becomes possible to employ a low-operating speed CMOS format converting circuit which converts the DS-3 signal into N parallel signals, which are then converted into the serial signal.

Figure 15A:
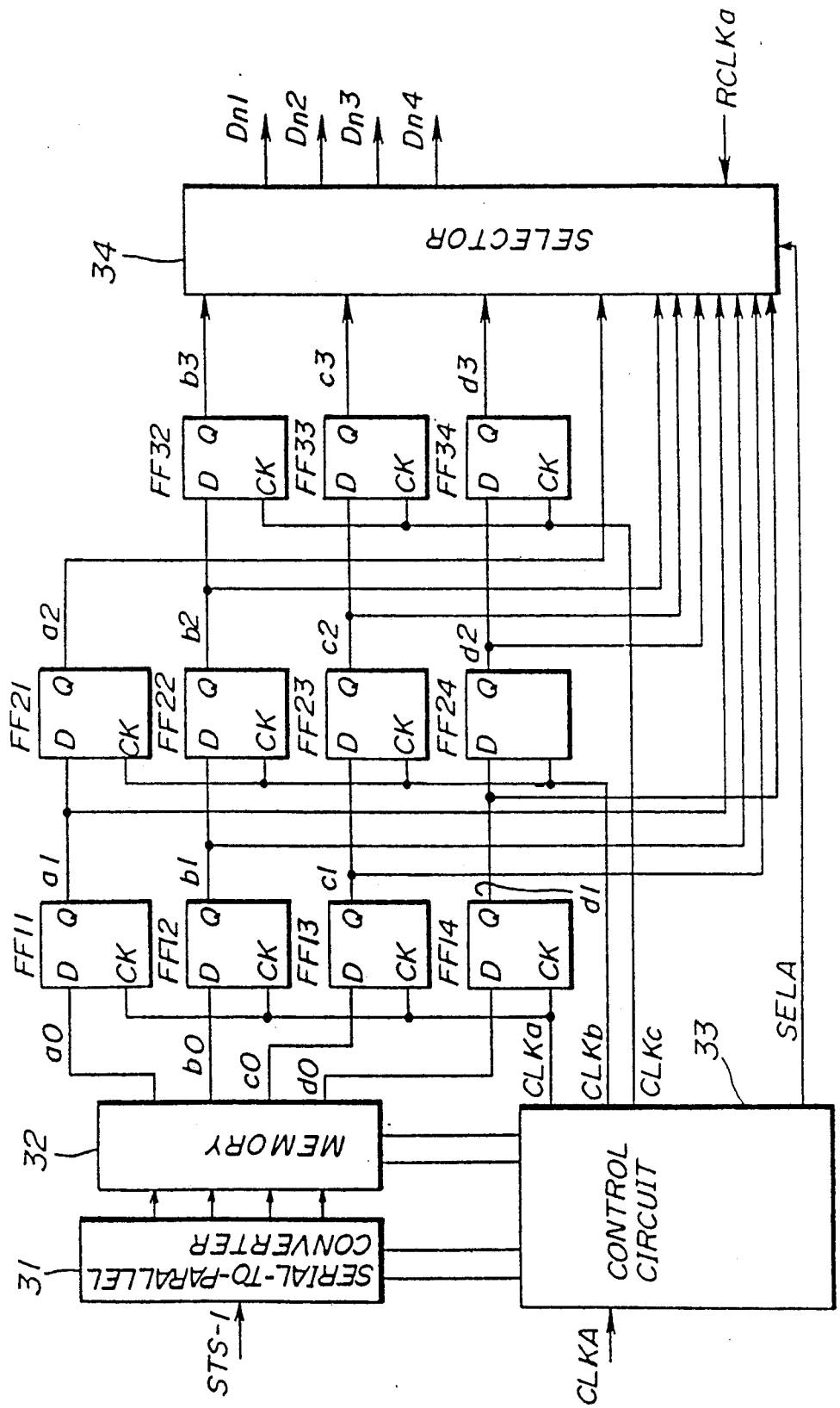
FIGS. 15A and 15B are block diagrams of a second preferred embodiment of the present invention.
Figure 15B:
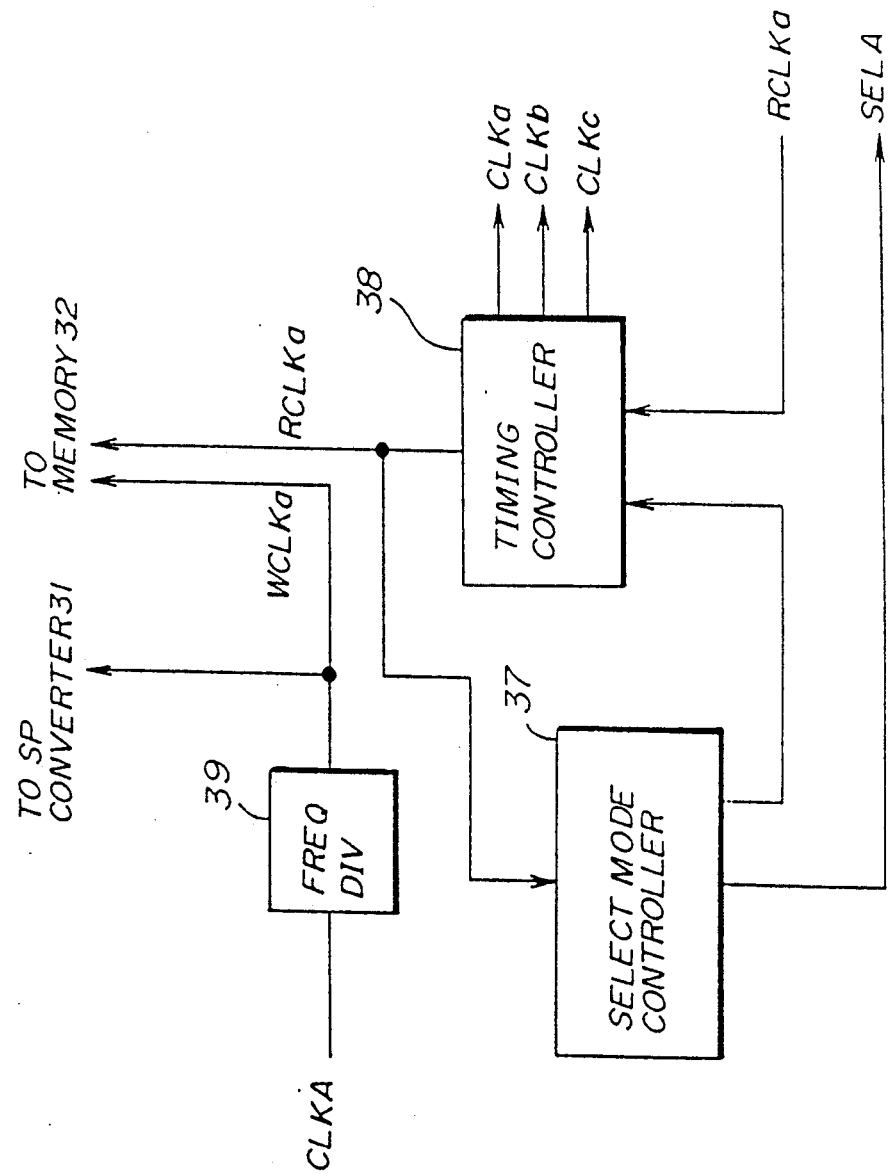

A description is given of a second preferred embodiment of the present invention with reference to FIGS. 15A and 15B. A configuration shown in FIGS. 15A and 15B (reception side configuration) functions to convert the STS-1 signal into four parallel signals. The configuration includes a SP converter 31, a memory 32, a control circuit 33, a selector 34 and a latch circuit which is composed of flip-flops FF11-FF14, FF21-FF24 and FF32-FF34. As shown in FIG. 15B, the control circuit 33 includes a select mode controller 37, a timing controller 38 and a frequency divider 39. The frequency divider 39 receives a clock signal CLKA to which the STS-1 signal from the transmission side is synchronized, and derives a write clock signal WCLKa therefrom. The write clock signal WCLKa is supplied to the SP converter 31 and the memory 32 shown in FIG. 15A. A read clock signal RCLKa is supplied to the selector 34 (FIG. 15A) and the timing controller 38, which is controlled by the select mode controller 37. The timing generator 38 outputs the read clock signal RCLKa, and clock signals CLKa, CLKb and CLKc, which have the same frequency. The select mode controller 37 determines which one of the time slots is being processed from the read clock signal RCLKa, and controls the timing generator 38. The select mode controller 37 further generates a select control signal SELA based on time slots, which is supplied to the selector 34.

The STS-1 signal is applied to the SP converter 31, and the clock signal CLKA synchronized to the STS-1 signal is applied to the control circuit 33. The STS-1 signal is converted into four parallel signals (M=4), which are input to the memory 32. Four parallel signals a0, b0, c0 and d0 read out from the memory 32 are applied to data terminals D of the flip-flops FF11, FF12, FF13 and FF14 respectively, and are latched therein in synchronism with the clock signal CLKa supplied from the timing circuit 38 of the the control circuit 33 to clock terminals C of the flip-flops FF11-FF14. Output signals a1, b1, c1, and d1 output from the Q terminals of the flip-flops FF11-FF14 are applied to data input terminals D of the flip-flops FF21-FF24 respectively, as well as the selector 34. The output signals a1-d1 are respectively latched by the flip-flops FF21-FF24 in synchronism with the clock signal CLKb applied to clock terminals CK thereof supplied from the timing circuit 38 of the control circuit 33. Output signals b2, c2 and d2 drawn from the Q terminals of the flip-flops FF22, FF23 and FF24 are applied to the data terminals D of the flip-flops FF32, F33 and FF34 and latched in synchronism with the clock signal CLKc applied to the clock terminals CK thereof supplied from the timing circuit 38 of the control circuit 33. The output signals a2-d2 from the flip-flops FF21-FF24 are supplied to the selector 34. Outputs b3, c3 and d3 drawn from the Q terminals of the flip-flops FF32, FF33 and FF34 are supplied to the selector 34. The selector 34 is controlled by the select control signal SELA supplied from the control circuit 33, and outputs parallel signals Dn1-Dn4, which are converted into a serial signal by the converter 16 (FIG. 3).

FIGS. 16 through 19 are time charts illustrating the operation of the second embodiment of the present invention. In these figures, the output signal a3 from the flip-flop FF31 is omitted for the sake of conveninenc.

Figure 16:
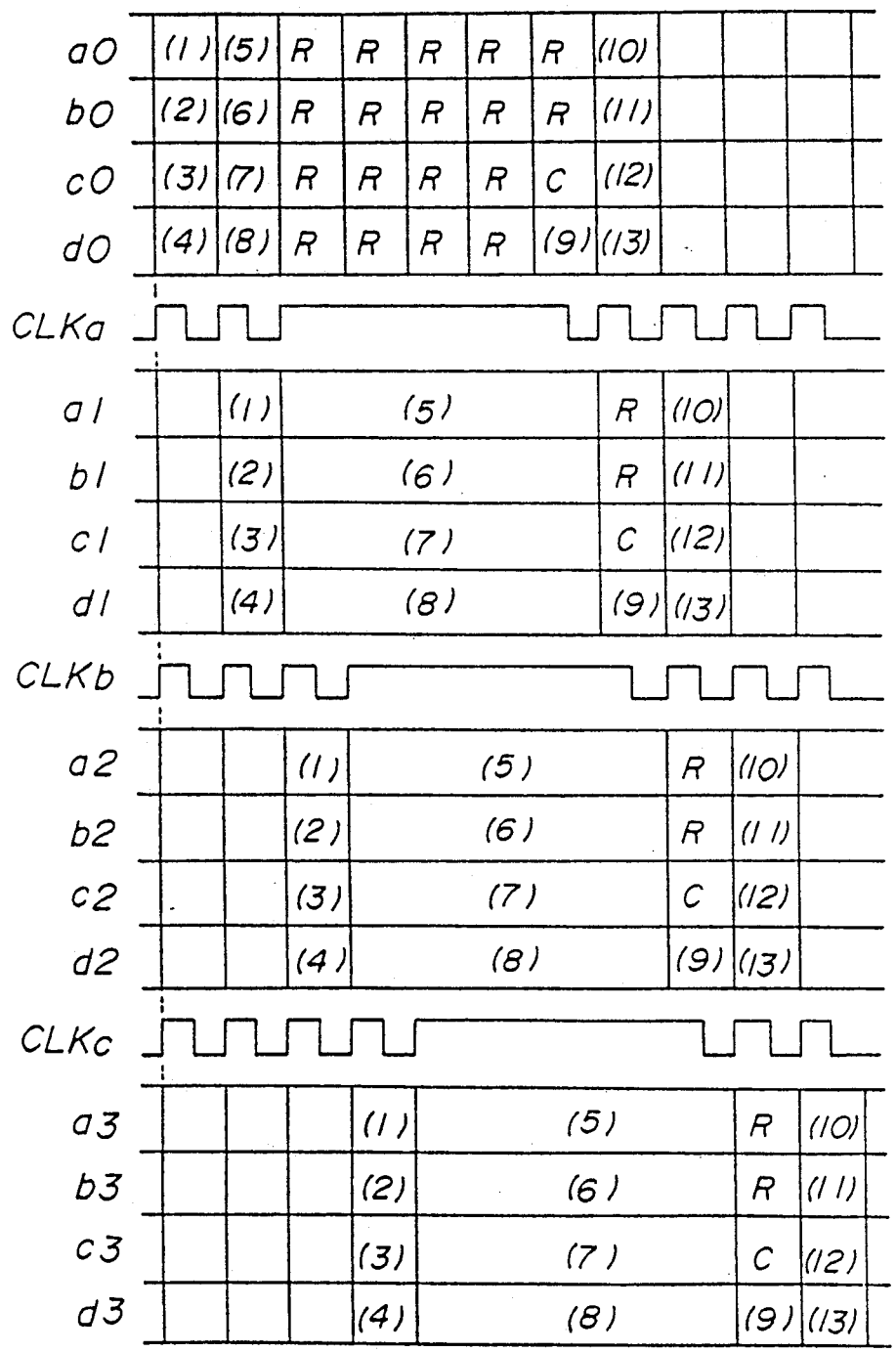

FIG. 16 is a time chart of signals relating to time slots $t_1$-$t_3$. Data bits are indicated by (1), (2), ..., and so on. When the parallel signals a0-d0 read out from the memory 32 are fixed stuff bits R, the supply of the clock signal CLKa from the control circuit 33 is stopped during a time equal to four bits. Thereby, data bits (5)-(8) are latched by the flip-flops FFII-FF14, respectively. The fixed stuff bits R which are read out from the memory 32 subsequently to the data bits (5)-(8), are not latched by the flip-flops FFII-FF14. That is, stuff bits are eliminated from the STS-1 signal by temporarily stopping supplying the clock signal CLKa. Since a sequence of R, R, C and (9) includes data bit (9), they are latched by the flip-flops FF11-FF14.

The clock CLKb lags behind the clock CLKa by one bit, and the clock CLKc lags behind the clock CLKb by one bit. Thus, while the supply of the clock signal CLKb is being stopped, the output signals a2-d2 of the flip-flops FF21-FF24 are latched data bits (5)-(8). Similarly, while the supply of the clock signal CLKc is stopped, the output signals a3-d3 of the flip-flops FF31-FF34 are latched data bits (5)-(8).

As a result, in the case where the current select mode of the selector 34 maintained until data bits (5)-(8) are read out from the memory 32 defines an order of a2, b2, c2 and d2 with respect to the four parallel signals Dn1, Dn2, Dn3 and Dn4, respectively, the number of stuff bits to be eliminated is 19, which is not an integer multiple of the number of the parallel signals (M=4). Thus, the select mode of the selector 34 is changed, by the select control signal SELA, to a select mode where the output signals d2, a1, b1 and c1 are assigned to the parallel signals Dn1, Dn2, Dn3 and Dn4, respectively. After data bits (5)-(8) are selectively output from the selector 34, fixed stuff bits R and stuff control bits C are eliminated so that data bits (9)-(12) are output from the selector 34.

At the time of non-stuffing, a data bit is placed in the position of the variable slot bit S. Thus, when eliminating stuff bits, the order of data bit in a serial signal simply converted from the parallel signals Dn1-Dn4 changes. Thus, the select mode of the selector 34 is changed.

FIG. 17 illustrates a select mode of the selector 34 to be made active when the order of data bits changes by simple parallel-to-serial conversion. In FIG. 17, A1 denotes an order of d3, d2, a1 and b1, A2 denotes an order of c3, d3, d2 and a1, and A3 denotes an order of b3, c3, d3 and d2.

Before time T1, that is, in a case where the output signals a2-d2 from the Q terminals of the flip-flops FF21-FF24 are selectively output as the parallel signals Dn1-Dn4, respectively, as in the case shown in FIG. 16, when the number of stuff bits to be eliminated is not an integer multiple of the number of the parallel signals (M=4), a select mode having an order of data bits of d2-a1-b1-c1 is selected in order to maintain the original order of data bits. Thereby three stuff bits in time slot T2 are eliminated.

After time T1, the output signals from the flip-flops are selectively output by the selector 34 in the state where the order of data bits is being shifted by one bit. At time T3, a select mode having the order of A1 (d3, d2, a1 and b1) is selected so that three corresponding stuff bits are eliminated. At time T4, a select mode having an order of c2, d2, a1 and b1 is selected. After T4, the output signals from the flip-flops are selectively output by the selector 34 in the state where the order of data bits is being shifted by two bits.

At time T5, the selector 34 is switched to a select mode having an order of A2 (c3, d3, d2 and a2) and three stuff bits are eliminated. At time T6, the selector 34 is switched to a select mode having an order of b2, c2, d2 and a1. After time T6, the output signals from the flip-flops are selectively output by the selector 34 in the state where the order of data bits are being shifted by three bits.

At time T7, the selector 34 is switched to a select mode having an order of A3 (b3, c3, d3 and d2) and three stuff bits are eliminated. At time T8, the selector 34 is switched to a select mode having an order of a2, b2, c2 and d2 so that the order of data bits returns to the original order.

Figure 18:
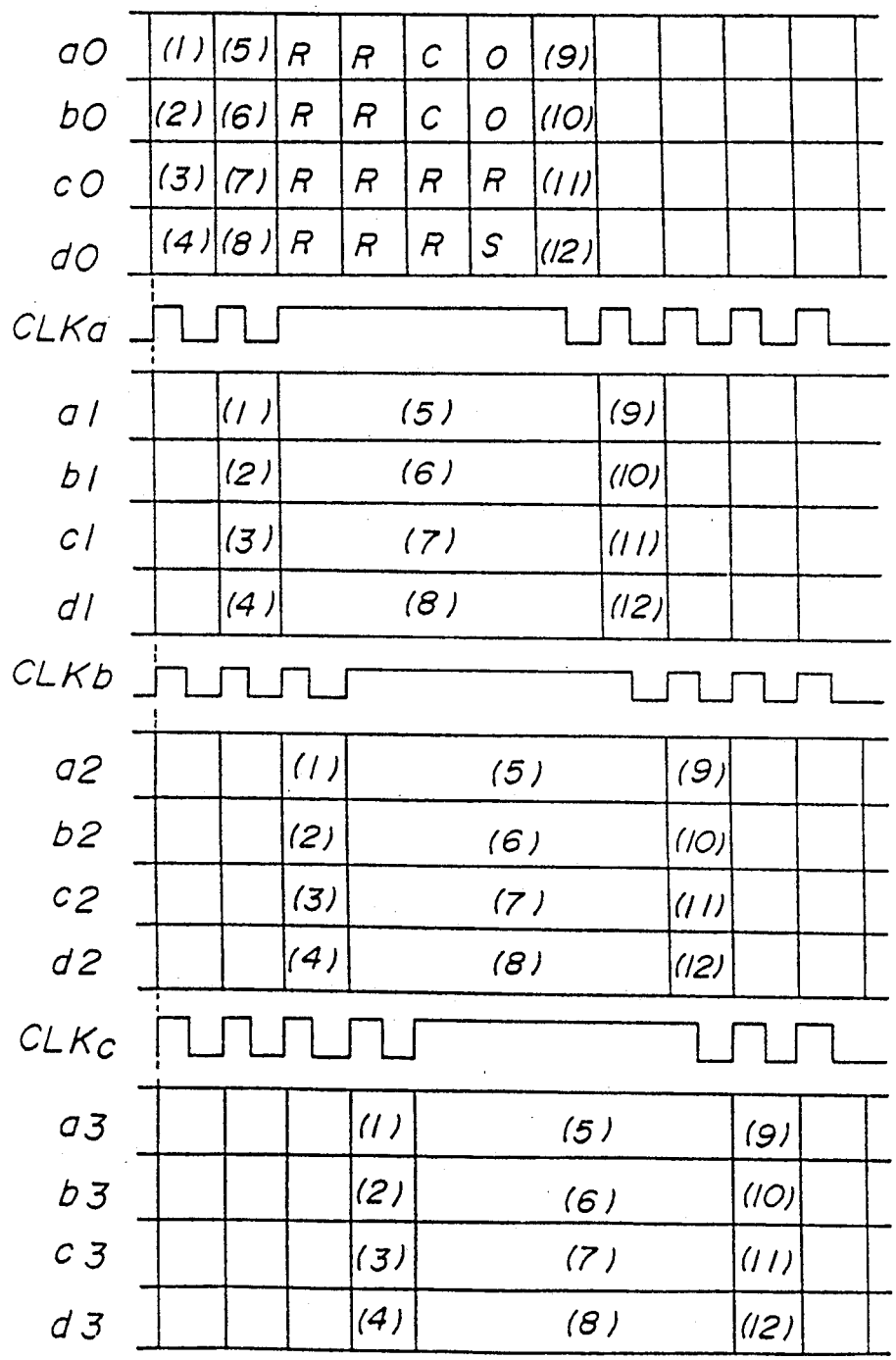

FIG. 18 is a time chart of signals in time slots $t_{57}$ and $t_{58}$, which is depicted so as to correspond to the time chart shown in FIG. 16. FIG. 18 illustrates a case where subsequently to data bits (1)-(8), eight fixed stuff bits R, two stuff control bits C, two fixed stuff bits R, two zero bits 0, fixed stuff bit R and one variable slot bit S. After data bits (5)-(8) are latched by the flip-flops FF11-FF14, the supply of the clock signal CLKa is stopped during a time equal to four bits and stuff bits are eliminated during this time. In this case, the number of stuff bits is 16, which is an integer multiple of the number of the parallel signals (M=4). Thus, there is no need for switching the select mode of the selector 34. That is, a serial signal converted from the parallel signals Dn1-Dn4 has the correct order of data bits.

FIG. 19 is a time chart of signals observed at the time of non-stuffing. Data bit (9) is read out from the memory 32 in the position of the variable slot bit S, and the number of stuff bits to be eliminated is 15, which is not an integer multiple of the number of the parallel signals (M=4). In this case, as shown in FIG. 17, the selector 34 is controlled so that the order of data bits does not change.

The numbers N and M of parallel signals are not limited to four. It is noted that the phase comparator 25, the stuff controller 26 and the timing controllers 28 and 38 can be configured with ease by those skill in the art from the description of the present specification. The procedure by each of the select mode controller 27 and 37 may be configured by software (a processor) or hardware (a sequential circuit).

The present invention is not limited to the aforementioned embodiments, and variations and modifications may be made without departing from the scope of the present invention.

What is claimed is:

1. A format converting system, comprising:
   first converting means for converting an input signal, having a first format, into N parallel signals, where N is an integer, each of the N parallel signals having a bit rate less than a bit rate of the input signal;
   latch means, operatively connected to said first converting means, for temporarily latching the N parallel signals in accordance with a clock signal and for outputting a first number of latched signals, where the first number is larger than N;
   selecting means, operatively connected to said latch means, for selectively outputting the latched signals from said latch means and a second number of stuff bits to be inserted into the N parallel signals in accordance with an order selected by a control signal to produce N parallel output signals having the latched signals and the stuff bits, the stuff bits being used for converting the first format of the input signal into a second frame format;
   control means, operatively connected to said latch means and said selecting means, for generating the clock signal and for generating the control signal, the control signal instructs said selecting means to change the order of selecting the latched outputs and the stuff bits to thereby form the N parallel output signal when the second number of the stuff bits to be inserted into the N parallel signals is not an integer multiple of N; and
   second converting means, operatively connected to said selecting means, for converting the N parallel output signals into a serial output signal having the second frame format.

2. A format converting system as claimed in claim 1, wherein said latch means comprises:
   first latch means for latching the N parallel signal from said first converting means; and
   second latch means, operatively connected to said first latch means, for latching (N−1) of the N parallel signals supplied from said first latch means, and
   wherein the N parallel signals from said first latch means and the (N−1) of the N parallel signals from said second latch means are supplied, as the latched signals, to said selecting means.

3. A format converting system as claimed in claim 2, wherein the clock signal comprises a first clock signal to be supplied to said first latch means, and a second clock signal to be supplied to said second latch means, and
wherein the second clock signal lags behind the first clock signal by a time equal to a predetermined number of bits.

4. A format converting system as claimed in claim 3, wherein the second clock signal lags behind the first clock signal by one bit.

5. A format converting system as claimed in claim 2, wherein said first latch means comprises N D-type flip-flops for latching the N parallel signals from said first converting means, and wherein said second latch means comprises (N−1) D-type flip-flops for latching the (N−1) of the N parallel signals supplied from said N D-type flip-flops of said first latch means.

6. A format converting system as claimed in claim 5, wherein said selecting means simultaneously outputs the N parallel output signals selected from among the N parallel signals supplied from said first latch means, the (N−1) of the N parallel signals supplied form said second latch means, and the stuff bits.

7. A format converting system as claimed in claim 1, wherein the N parallel signals contain a predetermined number of data bits per frame, and
wherein said control means comprises:
discriminating means for discriminating a first bit position where a bit order of data bits in the N parallel signals shifts by one bit from a second bit position where no shift of the bit order of the data bits in the N parallel signals occurs;
count means, operatively connected to said discriminating means, for counting a shift number indicating a number of times that ht bit order of the data bits in the N parallel signals shifts by one bit; and
select control means, operatively connected to said count means, for controlling said selecting means based on the shift number.

8. A format converting system as claimed in claim 7, wherein said selecting means includes a plurality of select modes based on he shift number,
wherein said select control means sets one of the plurality of select modes to said selecting means, and .
wherein said selecting means selectively outputs the latched signals and the stuff bits so as to form the parallel putput signal in accordance with the one of the plurality of select modes.

9. A format converting system as claimed in claim 1, wherein the input signal is a DS-3 signal in conformity with a synchronous optical system having a bit rate of 44.735 Mb/s, and the serial output signal is an STS-1 signal in conformity with the synchronous optical system having a bit rate of 51.84 Mb/s.

10. A format converting system, comprising:
first converting means for converting an input signal, having a second frame format, into M parallel signals, where M is an integer, the M parallel signals have stuff bits to convert a first frame format of the input signal into the second frame format, each of the M parallel signals having a bit rate less than that of the input signal;
latch means operatively connected to said first converting means, for temporarily latching the M parallel signals in accordance with a clock signal and for generating a first number of latched signals, where the first number is larger than M;
selecting means, operatively connected to said latch means, for selectively outputting the latched signals from said latch means in accordance with an order selected by a control signal to produce M parallel output signals obtained by eliminating the stuff bits from the M parallel signals;
control means, operatively connected to said latch means and said selecting means, for generating the clock signal and for generating the control signal, the control signal instructs said selecting means to change the order of selecting the latched outputs from said latch means when a second number of the stuff bits to be eliminated from the M parallel signal is not an integer multiple of M; and
second converting means, operatively connected to said selecting means, for converting the M parallel output signals from said selecting means into a serial output signal having the first frame format.

11. A format converting system as claimed in claim 10,
wherein said latch means comprises:
first latch means for latching the M parallel signals from said first converting means;
second latch means, operatively connected to said first latch means, for latching the M parallel signals supplied from said first latch means; and
third latch means, operatively connected to said second latch means, for latching (M−1) of the M parallel signals supplied from said second latch means, and
wherein the M parallel signals from each of said first and second latch means and the (M−1) of the parallel signals supplied from said third latch means are supplied, as the latched signals, to said selecting means.

12. A format converting system as claimed in claim 11,
wherein the clock signal comprises a first clock signal to be supplied to said first latch means, a second clock signal to be supplied to said second latch means, and a third clock signal to be supplied to said third latch means, and
wherein the second clock signal lags behind the first clock signal by a first lag time equal to a predetermined number of bits, and the third clock signal lag behind the second clock signal by a second lag time equal to a predetermined number of bits.

13. A format converting system as claimed in claim 12, wherein the second clock signal lags behind the first clock signal by one bit, and the third clock signal lags behind the second clock signal by one bit.

14. A format converting system as claimed in claim 11,
wherein said first latch means comprises M D-type flip-flops for latching the M parallel signals supplied from said M D-type flip-flops of said first latch means,
wherein said third latch means comprises (M−1) D type flip-flops for latching the (M−1) of the M parallel signals among the M parallel signals supplied from said M D-type flip-flops of said second latch means.

15. A format converting system as claimed in claim 12, wherein said selecting means simultaneously outputs the M parallel output signals selected from among the M parallel signals supplied form each of said first and second latch means, and the (M−1) of the M parallel signals supplied from said third latch means.

16. A format converting system as claimed in claim 10,
wherein the M parallel signals contain a predetermined number of data bits per frame, and
discriminating means for discriminating a first bit position where a bit order of data bits in the M parallel signals shifts by one bit from a second bit position where no shift o f the bit order of the data bits i th M parallel signals occurs;
count means, operatively connected to said discriminating means, for counting a shift number indicating a number of times that the bit order of the data bits in the M parallel signals shifts by one bit; and select control means, operatively connected to said count means, for controlling said selecting means based on the shift number.

17. A format converting system as claimed in claim 16,.

wherein said selecting means includes a plurality of select modes based on the sift number the plurality of select modes to said selecting means, and wherein said selecting means effectively outputs the latched signals so as to form the M parallel output signals in accordance with the one of the plurality of select mods.

18. A format converting system as claimed in claim 10, wherein the input signal is an STS-1 signal in conformity with a synchronous optical system having a bit rate of 51.84 Mb/s, and the serial output signal is a DS-1 signal inconformity with the synchronous optical system having a bit rate of 44.736 Mb/s.

19. A method for converting a serial input signal having a first format to a serial output signal having a second format, said method comprising the steps of:

(a) receiving the serial input signal having the first format;

(b) dividing the serial input signal into N parallel signals, where N is an integer;

(c) consecutively storing the N parallel signals to a current storage unit and a plurality of the N parallel signals previously stored the current storage unit to a previous storage unit;

(d) ordering the N parallel signals in the current storage unit, the plurality of the N parallel signals int eh previous storage unit, and a number of stuff bits to produce N parallel output signals; and (e) converting the N parallel output signal into the serial output signal having the second format.

20. A method as claimed in claim 190, wherein said ordering in step (d) comprises the steps of:

(i) inserting the stuff bits into the N parallel output signals for converting from the first format to the second format, and (ii) reordering a sequential order of the N parallel signals when the number of stuff bits to be inserted is not an integer multiple of N.

21. A method for converting a serial input signal having a first format to a serial output signal having a second format, said method comprising the steps of:

(a) receiving the serial input signal having the first format;

(b) dividing the serial input signal into N parallel signals, where N is an integer;

(c) consecutively storing the N parallel signals to a current storage unit, the N parallel signals previously stored in the current storage unit to a first previously storage unit, and a plurality of the N parallel signals previously stored in the first previous storage unit to a second previous storage unit;

(d) ordering the N parallel signals in the current storage unit, the Nparallel signals in the first previous storage unit, and the plurality of the N parallel signals in the second previous storage unit to produce N parallel output signals; and (e) converting the N parallel output signals into the serial output signal having the second format.

22. A method as claimed in claim 21, wherein said ordering in step (d) comprises the steps of:

(i) eliminating the stuff bits from the N parallel output signals, and (ii) reordering a sequential order of the N parallel signals when the number of the stuff bits to e eliminated is not an integer multiple of N.

* * * * *

UNITED STATES PATENT AND TRADEMARK OFFICE
CERTIFICATE OF CORRECTION

PATENT NO. : 5,030,951
DATED : July 9, 1991
INVENTOR(S) : Eda, et al

It is certified that error appears in the above-indentified patent and that said Letters Patent is hereby corrected as shown below:

On the title page, Item [57] line 9, In the Abstract change "in" to --into--.

Col. 3, line 20, change "converti" to --converting--;

Col. 3, line 35, change "means," to --unit,--;

Col. 3, line 36, change "units," to --unit,--;

Col. 3, line 43, change "means" to --unit--;

Col. 3, line 68, change "M the" to --the M--.

Col. 9, line 64, change "order of" to --order ($t_{57}$) of--.

Col. 10, line 66, change "t case," to --this case,--.

Col. 13, line 46, change "0, fixed" to --0, (one) fixed--.

UNITED STATES PATENT AND TRADEMARK OFFICE
CERTIFICATE OF CORRECTION

PATENT NO. : 5,030,951

DATED : July 9, 1991

INVENTOR(S) : Eda, et al

Page 2 of 5

It is certified that error appears in the above-identified patent and that said Letters Patent is hereby corrected as shown below:

Col. 14, line 44, change "signal" to --signals--.

Col. 15, line 9, change "form" to --from--.

Col. 15, line 22, change "ht" to --the--;

Col. 15, line 30, change "he" to --the--;

Col. 15, line 36, change "putput" to --output--;

Col. 15, line 41, change "44.735" to --44.736--.

Col. 16, line 1, change "signal" to --signals--;

Col. 16, line 43, change "signals sup-" to --signals from said first converting means,--;

Col. 16, line 44, delete line in its entirety;

UNITED STATES PATENT AND TRADEMARK OFFICE
CERTIFICATE OF CORRECTION

PATENT NO. : 5,030,951
DATED : July 9, 1991
INVENTOR(S) : Eda, et al

It is certified that error appears in the above-identified patent and that said Letters Patent is hereby corrected as shown below:

Col. 16, line 45, delete line in its entirety and insert the following paragraph:

--wherein said second latch means comprises M D-type flip-flops for latching the M parallel signals supplied from said M D-type flip-flops of said first latch means, and--;

Col. 16, line 54, change "form" to --from--;

Col. 16, line 60, after "and" insert the following paragraph:

--wherein said control means comprises:--;

Col. 16, line 64, change "o f" to --of--;

Col. 16, line 65, change "i th" to --in the--.

UNITED STATES PATENT AND TRADEMARK OFFICE
CERTIFICATE OF CORRECTION

PATENT NO. : 5,030,951
DATED : July 9, 1991
INVENTOR(S) : Eda, et al

It is certified that error appears in the above-identified patent and that said Letters Patent is hereby corrected as shown below:

Col. 17, line 10, change "sift number the plurality" to --shift number--;

Col. 17, line 11, delete line in its entirety and insert the following paragraph:
  --wherein said select control means sets one of the plurality of select modes to said selecting means, and--;

Col. 17, line 12, change "effectively" to --selectively--;

Col. 17, line 32, change "stored the" to --stored in the--;

Col. 17, line 36, change "int" to --in the--;

Col. 17, line 37, delete "eh".

UNITED STATES PATENT AND TRADEMARK OFFICE
CERTIFICATE OF CORRECTION

PATENT NO. : 5,030,951
DATED : July 9, 1991
INVENTOR(S) : Eda, et al

Page 5 of 5

It is certified that error appears in the above-identified patent and that said Letters Patent is hereby corrected as shown below:

Col. 18, line 1, change "signal" to --signals--;

Col. 18, line 3, change "190," to --19,--;

Col. 18, line 25, change "Nparallel" to --N parallel--;

Col. 18, line 36, change "the stuff bits to e" to --stuff bits to be--.

Signed and Sealed this

Second Day of November, 1993

Attest:

BRUCE LEHMAN

*Attesting Officer*　　*Commissioner of Patents and Trademarks*